United States Patent
Santos

(10) Patent No.: US 12,378,456 B2
(45) Date of Patent: *Aug. 5, 2025

(54) INFLATABLE SAFETY DEVICES

(71) Applicant: DOW SILICONES CORPORATION, Midland, MI (US)

(72) Inventor: Elizabeth M. Santos, Midland, MI (US)

(73) Assignee: DOW SILICONES CORPORATION, Midland, MI (US)

( * ) Notice: Subject to any disclaimer, the term of this patent is extended or adjusted under 35 U.S.C. 154(b) by 408 days.

This patent is subject to a terminal disclaimer.

(21) Appl. No.: 18/012,186

(22) PCT Filed: Jun. 23, 2021

(86) PCT No.: PCT/US2021/038648
§ 371 (c)(1),
(2) Date: Dec. 21, 2022

(87) PCT Pub. No.: WO2021/262828
PCT Pub. Date: Dec. 30, 2021

(65) Prior Publication Data
US 2023/0257639 A1 Aug. 17, 2023

Related U.S. Application Data

(60) Provisional application No. 63/043,415, filed on Jun. 24, 2020.

(51) Int. Cl.
| | |
|---|---|
| *C09J 183/04* | (2006.01) |
| *B60R 21/235* | (2006.01) |
| *C09J 5/00* | (2006.01) |
| *C09J 11/04* | (2006.01) |
| *C09J 11/06* | (2006.01) |
| *C09J 11/08* | (2006.01) |

(52) U.S. Cl.
CPC ........... *C09J 183/04* (2013.01); *B60R 21/235* (2013.01); *C09J 5/00* (2013.01); *C09J 11/04* (2013.01); *C09J 11/06* (2013.01); *C09J 11/08* (2013.01); *B60R 2021/23509* (2013.01); *C09J 2400/266* (2013.01); *C09J 2483/00* (2013.01)

(58) Field of Classification Search
CPC ... C09J 183/04; C09J 5/00; C09J 11/04; C09J 11/06; C09J 11/08; C09J 2400/266; C09J 2483/00; C09J 7/30; C09J 7/25; C09J 2301/408; C09J 2469/006; B60R 21/235; B60R 2021/23509; B60R 2021/23514; C08L 83/04; C08G 77/12; C08G 77/14; C08G 77/18; C08G 77/20; C08K 3/26; C08K 3/34; C08K 5/56; C09D 183/04
See application file for complete search history.

(56) References Cited

U.S. PATENT DOCUMENTS

| | | |
|---|---|---|
| 3,419,593 A | 12/1968 | Willing |
| 3,715,334 A | 2/1973 | Karstedt |
| 3,814,730 A | 6/1974 | Karstedt |
| 3,989,667 A | 11/1976 | Lee et al. |
| 4,742,103 A | 5/1988 | Morita et al. |
| 6,201,092 B1 | 3/2001 | Hara |
| 6,605,734 B2 | 8/2003 | Roy et al. |
| 7,429,636 B2 | 9/2008 | Asch et al. |
| 7,674,348 B2 | 3/2010 | Aketa et al. |
| 2003/0162875 A1 | 8/2003 | Aketa et al. |
| 2005/0137321 A1 | 6/2005 | Dumont et al. |
| 2010/0144960 A1* | 6/2010 | Cray .................... C08L 101/02 524/588 |
| 2010/0255205 A1 | 10/2010 | Cray et al. |
| 2011/0076479 A1* | 3/2011 | Danielson ................. C09J 5/02 428/221 |
| 2012/0245272 A1* | 9/2012 | Dent ...................... C08G 77/50 524/502 |
| 2021/0317335 A1* | 10/2021 | Felder .................... C08L 83/06 |

FOREIGN PATENT DOCUMENTS

| | | |
|---|---|---|
| CN | 101258209 A | 9/2008 |
| CN | 101517002 A | 8/2009 |
| JP | 2012082300 A | 4/2012 |
| WO | 2015116776 A1 | 8/2015 |

(Continued)

OTHER PUBLICATIONS

Li T.L. et al., "Study on corrosion resistance of γ-aminopropyl methyldimethoxysilane modified epoxy coatings", Dec. 31, 2018, Silicone Materials, vol. 3, No. 5., pp. 367-372 [cited as "A" reference].

(Continued)

*Primary Examiner* — Michael B Nelson
(74) *Attorney, Agent, or Firm* — Warner Norcross + Judd LLP

(57) ABSTRACT

This disclosure describes inflatable articles such as airbags for inflatable safety devices for a vehicle passenger-protecting system, a process for manufacturing said inflatable articles, hydrosilylation curable silicone elastomer compositions and their uses in assembling said inflatable safety devices. The composition used comprised an organopolysiloxane based additive which comprises at least one, alternatively at least two Si—H groups per molecule and at least one, alternatively at least two functional groups per molecule, selected from anhydride groups and epoxy groups.

16 Claims, No Drawings

(56) References Cited

FOREIGN PATENT DOCUMENTS

WO    2020131369 A1    6/2020

OTHER PUBLICATIONS

Cai, Guoping et al., "Synthesis of terminal Si—H irregular tetra-branched star polysiloxanes. Pt-catalyzed hydrosilylation with unsaturated epoxides. Polysiloxane films by photo-acid catalyzed crosslinking", Apr. 27, 2004, Polymer, vol. 45, No. 9., pp. 2941-2948.
Machine assisted English translation of JP2012082300A obtained from <https://patents.google.com/patent> on Dec. 2, 2024, 14 pages.
International Search Report for PCT/US2021/038648 dated Oct. 18, 2021, 4 pages.

* cited by examiner

INFLATABLE SAFETY DEVICES

CROSS-REFERENCE TO RELATED APPLICATIONS

This application is the U.S. National Stage of International Application No. PCT/US2021/038648 filed on 23 Jun. 2021, which claims priority to and all advantages of U.S. Provisional Patent Application No. 63/043,415 filed on 24 Jun. 2020, the content of which is incorporated herein by reference.

This disclosure describes inflatable articles, such as airbags for inflatable safety devices in a vehicle passenger-protecting system, a process for manufacturing said inflatable articles, hydrosilylation curable silicone elastomer compositions and their uses in assembling said inflatable safety devices.

Inflatable safety device systems are used by the automotive industry to protect vehicle occupants in the event of an accident by reducing injuries. Such Inflatable safety device systems typically comprise a sensor, an inflator, and an inflatable article e.g. an airbag to provide a vehicle occupant with a soft cushioning and restraint during a crash event. In the event of an accident, the sensor is set off, thereby activating the inflator to fill the airbag with a gas in order to place a cushion between the occupant and potentially harmful surfaces in the vehicle.

All of these operations need to occur within milliseconds after the accident in order to effectively protect the occupant. The airbag provides an energy-absorbing surface between the vehicle's occupants and a steering wheel, instrument panel, body pillar, headliner, and windshield. Modern vehicles may contain up to 10 airbag modules in various configurations, including: driver, passenger, side-curtain, seat-mounted, door-mounted, B and C-pillar mounted side-impact, knee bolster, inflatable seat belt, and pedestrian airbag modules.

For some inflatable article, such as airbag, applications, pressurised gas has to be retained in a fabric envelope for a relatively long period. This requirement exists, for example, with respect to side curtain airbags for the automotive industry. These side curtain airbags are intended to inflate at the time of impact, as do conventional airbags. The side curtains unfold to form a cushioned curtain between passengers and some of the side of the car body, e.g., the windows. As the intention is not merely to cushion the blow on impact itself, as is the case for conventional driver and passenger airbags, but to protect passengers e.g. when a car is rolling, it is important that the side curtain air bag is sufficiently pressurised during such rolling process. Whilst conventional driver and passenger airbags only need to retain pressure for a fraction of a second, it is desirable that side curtain airbags maintain a suitable pressure for a few seconds and as such the latter are usually treated by coating with an elastomeric coating which reduces or prevents deflation of the airbag. Similar applications exist where a pressurised fabric structure is desired to maintain a certain gas pressure for a relatively extended period of time, e.g. in emergency chutes for aeroplanes, or inflatable rafts.

Other inflatable article applications do not necessarily require such coatings, e.g. if they are merely designed to retain pressure for a fraction of a second upon impact and these may be referred to as untreated inflatable articles.

Historically, airbags are often made from two main fabric sheets which are connected to one another at their circumferential edge using gas-tight stitching but an increasing number of alternatives are also used. The fabric sheets are often formed from a woven or knitted fabric made of synthetic fibre, for example of polyamide such as nylon-6,6 or polyester and may, depending upon the intended application, be coated with e.g. an elastomeric coating to render the airbags. When the airbag is inflated, one of the main sheets of fabric is turned towards one or more of the passengers to be protected. The other sheet supports itself in the inflated state of the airbag device for example on one or more lateral windows and/or on the lateral vehicle structure. The fabric sheets of a typical airbag are sewn together to provide sufficient mechanical strength by, for example, bonding a first panel and a second panel together with a silicone adhesive applied to the periphery of the panels and thereafter sewing the panels together with one or more seams of sewing thread or yarn. The seams are sewn through the silicone adhesive to provide sufficient gas imperviousness and/or pressure retention when the airbag is deployed. These properties result in a relatively time consuming and expensive process to assemble airbags, in which multiple steps are required to seal and sew seams.

However, in airbags configured using sewing stitches to provide the structural integrity of the seam the sewing stitches produce holes or voids in the fabric panels of the airbag cushion from the sewing needles, which reduce the strength of the airbag panel local to the seam. The panel strength degradation occurs local to the seam when the stitching is applied, since the stitching produces a hole or void in the airbag panel for each pass of the thread or yarn. Hence, each needle hole introduced creates a weakness in the airbag fabric which may, when under the high temperature and high stress caused upon impact and release of the airbag from storage, tear and consequently fail to cushion the intended occupant. This is particularly a concern where the airbags are pre-coated and intended to stay inflated for extended periods.

There is provided herein an inflatable article comprising:
a first fabric sheet and a second fabric sheet superimposed thereon and
a cured silicone adhesive, forming a non-sewn seam-bond between the first and second fabric sheets such that a bag-like structure is created, wherein the non-sewn seam-bond has a peak load/width of at least 3.5 kN/m and the cured silicone adhesive is an elastomeric product of a curable silicone elastomer composition comprising:

(A) one or more organopolysiloxanes containing at least two alkenyl and/or alkynyl groups per molecule and having a viscosity in a range of 1000 mPa·s to 500,000 mPa·s at 25° C.;

(B) a curing agent comprising (B)(i) an organic peroxide radical initiator; or (B)(ii) a hydrosilylation cure catalyst package comprising a. an organosilicon compound having at least two, alternatively at least three Si—H groups per molecule; and b. hydrosilylation catalyst;

(C) at least one reinforcing filler and optionally one or more non-reinforcing fillers; and (D) one or more organopolysiloxane based additives each of which comprises at least one, alternatively at least two Si—H groups per molecule and at least one, alternatively at least two functional groups per molecule, selected from anhydride groups and epoxy groups.

There is also provided a process for making an inflatable article comprising:
  (i) applying a first bead of a curable silicone elastomer composition as described herein around the periphery of a first fabric sheet
  (ii) contacting the first bead of the curable silicone elastomer composition with a surface of a second fabric sheet, and
  (iii) forming a non-sewn seam comprising a cured silicone elastomeric product of the curable silicone elastomer composition thereby adhering the first fabric sheet to the fabric sheet through a non-sewn seam; wherein the resulting non-sewn seam-bond has a Peak Load/Width of at least 3.5 kN/m.

There is also provided a process for making an inflatable article comprising:
  (i) applying a first bead of a curable silicone elastomer composition as described herein around the periphery of a first fabric sheet;
  (ii) applying a second bead of a curable silicone elastomer composition as hereinbefore described around the periphery of a second fabric sheet;
  (iii) contacting a first exposed surface of the first bead and a second exposed surface of the second bead to form one bead; and
  (iv) forming a non-sewn seam comprising a cured silicone elastomeric product of the curable silicone elastomer composition thereby adhering the first fabric sheet to the second fabric sheet through a non-sewn seam; wherein the resulting non-sewn seam-bond has a Peak Load/Width of at least 3.5 kN/m.

There is also provided the use of a curable silicone elastomer composition as hereinbefore described as a seam sealant for an inflatable article.

For the avoidance of doubt the peak load/width values as described herein are determined by use of the method described in the Examples herein.

Each fabric sheet is preferably a woven fabric, particularly a plain weave fabric, but can for example be a knitted or nonwoven fabric. The fabric may be made from synthetic fibres or blends of natural and synthetic fibres, for example polyamide fibres such as nylon-6,6, polyester, polyimide, polyethylene, polypropylene, polyester-cotton, or glass fibres. For use as an inflatable article, e.g. airbag fabric, the fabric should be sufficiently flexible to be able to be folded into relatively small volumes, but also sufficiently strong to withstand deployment at high speed, e.g. under the influence of an explosive charge. As will be discussed below the fabric may be treated with an elastomeric coating to prevent or reduce deflation after inflation, if inflation is required for an extended period, or may be untreated for "impact" applications where the inflatable article is designed to be inflated upon impact for e.g. no more than a second.

Herein, the silicone adhesive composition is described in detail.

Each of the one or more organopolysiloxanes (A) contain at least 2 alkenyl and/or alkynyl groups, typically alkenyl groups bonded to a silicon atom per molecule and has a viscosity of from 1000 mPa·s to 500,000 mPa·s at 25° C., alternatively 1000 mPa·s to 200,000 mPa·s at 25° C., alternatively 1000 mPa·s to 150,000 mPa·s at 25° C., alternatively 1000 mPa·s to 75,000 mPa·s at 25° C. using a Brookfield® rotational viscometer using Spindle (LV-4) and adapting the speed (shear rate) according to the polymer viscosity. All viscosity measurements were measured at 25° C. unless otherwise indicated.

Examples of alkenyl groups include vinyl, allyl, butenyl, pentenyl, cyclohexenyl and hexenyl groups. These may be pendent or terminal or at both positions, that is, they may be present on any of the siloxy units of the organopolysiloxane (A). Component (A) comprises straight chain and/or branched organopolysiloxanes comprising multiple units of the formula (1)

$$R'_a SiO_{4-a/2} \tag{1}$$

wherein each R' may be the same or different and denotes a hydrocarbon group having from 1 to 18 carbon atoms, a substituted hydrocarbon group having from 1 to 18 carbon atoms or a hydrocarbonoxy group having up to 18 carbon atoms and has, on average, a value of from 1 to 3, preferably 1.8 to 2.2.

For the purpose of this application "Substituted" means one or more hydrogen atoms in a hydrocarbon group has been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, trifluoropropyl and nonafluorohexyl; oxygen atoms; oxygen atom containing groups such as (meth)acrylic and carboxyl; nitrogen atoms; nitrogen atom containing groups such as amino-functional groups, amido-functional groups, and cyano-functional groups; sulphur atoms; and sulphur atom containing groups such as mercapto groups.

Siloxy units may be described by a shorthand (abbreviated) nomenclature, namely—"M," "D," "T," and "Q", when R is usually an alkyl group unless otherwise indicated, e.g. a methyl group (further teaching on silicone nomenclature may be found in Walter Noll, Chemistry and Technology of Silicones, dated 1962, Chapter I, pages 1-9). The M unit corresponds to a siloxy unit where a=3, that is $R_3SiO_{1/2}$; the D unit corresponds to a siloxy unit where a=2, namely $R_2SiO_{2/2}$; the T unit corresponds to a siloxy unit where a=1, namely $R_1SiO_{3/2}$; the Q unit corresponds to a siloxy unit where a=0, namely $SiO_{4/2}$.

Examples of ingredient (A) are polydiorganosiloxanes containing alkenyl or alkynyl groups but typically alkenyl groups at the two terminals and are represented by the general formula (I):

$$R'R''R'''SiO\text{---}(R''R'''SiO)_m\text{---}SiOR'''R''R' \tag{I}$$

In formula (I), each R' is an alkenyl or alkynyl group but typically an alkenyl group, which typically contains from 2 to 10 carbon atoms, such as vinyl, allyl, and 5-hexenyl.

R" does not contain ethylenic unsaturation. Each R" may be the same or different and is individually selected from monovalent saturated hydrocarbon radical, which typically contain from 1 to 10 carbon atoms, and monovalent aromatic hydrocarbon radical, which typically contain from 6 to 12 carbon atoms. R" may be unsubstituted or substituted with one or more groups that do not interfere with curing of this inventive composition, such as halogen atoms. R'" is R' or R" and m represents a degree of polymerization suitable for ingredient (A) to have a viscosity within the range discussed below.

Typically, all R" and R'" groups contained in a compound in accordance with formula (I) are methyl groups. Alternatively, at least one R" and/or R'" group in a compound in accordance with formula (I) is methyl and the others are phenyl or 3,3,3-trifluoropropyl. This preference is based on the availability of the reactants typically used to prepare the polydiorganosiloxanes (ingredient (A)) and the desired properties for the cured elastomer prepared from compositions comprising such polydiorganosiloxanes.

Particularly preferred examples of groups R' include methyl, ethyl, propyl, butyl, cyclohexyl, phenyl, tolyl group, a propyl group substituted with chlorine or fluorine such as 3,3,3-trifluoropropyl, chlorophenyl, beta-(perfluorobutyl) ethyl or chlorocyclohexyl group. Preferably, at least some and more preferably substantially all of the groups R" are methyl. Some R' groups may be phenyl groups or fluoro groups. In one alternative, the polydiorganosiloxanes are largely polydialkylsiloxanes and/or polydialkylalkylphenylsiloxanes having at least two alkenyl groups per molecule. In a further alternative the polydiorganosiloxanes are largely polydimethylsiloxanes having at least two alkenyl groups per molecule. They are preferably substantially linear materials, which are end-blocked with a siloxane group of the formula $R''_3SiO_{1/2}$,
wherein each R" is the same or different. It is understood that the cure rate and physical properties of curable composition are impacted by the structure and degree of functionality of component (A). For example, it may be advantageous in some embodiments to utilize branched, resinous or cyclic containing organopolysiloxanes with pendant alkenyl or alkynyl groups as part or all of component (A).

The viscosity of organopolysiloxane (A) at 25° C. is typically using a Brookfield® rotational viscometer using Spindle (LV-4) and adapting the speed (shear rate) according to the polymer viscosity and all viscosity measurements were taken at 25° C. unless otherwise indicated.

Examples of the organopolysiloxane (A) which may be used include vinyldimethylsiloxy-endblocked dimethylsiloxane-vinylmethylsiloxane copolymer, vinyldimethylsiloxy-endblocked polydimethylsiloxane, vinylmethylhydroxysiloxy-endblocked dimethylsiloxane-vinylmethylsiloxane copolymer, and mixtures thereof.

The organopolysiloxane (A) may be either a single polymer, or a combination of two or more different polymers.

The organopolysiloxane (A) is present in the composition at a level of from 10 to 85% by weight based on the total weight of the composition, alternatively 20 to 80% by weight based on the total weight of the composition, alternatively 20 to 75% by weight based on the total weight of the composition, alternatively from 30 to 65% by weight based on the total weight of the composition.

B) Curing Agent

The composition as described herein may be cured with an organic peroxide radical initiator (B)(i) or mixtures of different types of peroxide catalysts.

The peroxide radical initiator (B)(i) may be any of the well-known commercial peroxides used to cure silicone and/or fluorosilicone elastomer compositions. The amount of organic peroxide used is determined by the nature of the curing process, the organic peroxide used, and the composition used. Typically, the amount of peroxide radical initiator (B)(i) utilised in a composition as described herein is from 0.2 to 3% wt., alternatively 0.2 to 2% wt. in each case based on the weight of the composition.

Suitable organic peroxides are substituted or unsubstituted dialkyl-, alkylaroyl-, diaroyl-peroxides, e.g. benzoyl peroxide and 2,4-dichlorobenzoyl peroxide, ditertiarybutyl peroxide, dicumyl peroxide, lauroyl peroxide, t-butyl cumyl peroxide, bis(t-butylperoxyisopropyl) benzene, cyclohexanone peroxide, cumene hydroperoxide, tert-butyl hydroperoxide bis(t-butylperoxy)-2,5-dimethyl hexyne, 2,4-dimethyl-2,5-di(t-butylperoxy) hexane, di-t-butyl peroxide, and 2,5-bis(tert-butyl peroxy)-2,5-dimethylhexane.

Alternatively the composition may be cured using a hydrosilylation catalyst package (B)(ii) in the form of (B)(ii)(a) an organosilicon compound having at least 2, alternatively at least 3 Si—H groups per molecule; and (B)(ii)(b) a hydrosilylation catalyst.

Component (B)(ii)(a) is a cross-linker in the form of an organosilicon compound containing at least two or three silicon-bonded hydrogen atoms per molecule. Component (B)(ii)(a) normally contains three or more silicon-bonded hydrogen atoms so that the hydrogen atoms can react with the unsaturated alkenyl or alkynyl groups of polymer (A) to form a network structure therewith and thereby cure the composition. Some or all of Component (B)(ii)(a) may alternatively have two silicon bonded hydrogen atoms per molecule when polymer (A) has greater than (>) two alkenyl or alkynyl groups per molecule.

The structure of the organosilicon compound can be linear, branched, cyclic, or resinous. Cyclosilanes and cyclosiloxanes can have from 3 to 12 silicon atoms, alternatively from 3 to 10 silicon atoms, alternatively from 3 to 4 silicon atoms. In acyclic polysilanes and polysiloxanes, the silicon-bonded hydrogen atoms can be located at terminal, pendant, or at both terminal and pendant positions.

Examples of suitable organosilanes can include diphenylsilane, 2-chloroethylsilane, bis[(p-dimethylsilyl)phenyl] ether, 1,4-dimethyldisilylethane, 1,3,5-tris(dimethylsilyl) benzene, 1,3,5-trimethyl-1,3,5-trisilane, poly (methylsilylene)phenylene, and poly(methylsilylene) methylene. In some examples, the organohydrogensilane can have the formula $HR^1{}_2Si—R^2—SiR^1{}_2H$, wherein $R^1$ is $C_1$ to $C_{10}$ hydrocarbyl or $C_1$ to $C_{10}$ halogen-substituted hydrocarbyl, both free of aliphatic unsaturation, and $R^2$ is a hydrocarbylene group free of aliphatic unsaturation having a formula selected from 1,4- or 1,3-disubstituted phenyl, 4,4'- or 3,3'-disubstituted-1,1'-biphenyl, or para- or meta-disubstituted $Ph(C_gH_{2g})Ph$.

The molecular configuration of the organopolysiloxane containing at least 2 or 3 silicon-bonded hydrogen atoms per molecule (B)(ii)(a) is not specifically restricted, and it can be a straight chain, a straight chain with some branching, cyclic or silicone resin based. While the molecular weight of this component is not specifically restricted, the viscosity is typically from 0.001 to 50 Pa·s at 25° C. relying on the cup/spindle method of ASTM D 1084 Method B, using the most appropriate spindle from the Brookfield® RV or LV range for the viscosity range, in order to obtain a good miscibility with polymer (A).

Silicon-bonded organic groups used in component (B)(ii) (a) maybe exemplified by methyl, ethyl, propyl, butenyl, pentenyl, hexyl, or similar alkyl groups; phenyl, tolyl, xylyl, or similar aryl groups; 3-chloropropyl, 3,3,3-trifluoropropyl, or similar halogenated alkyl group, preferable of which are methyl and phenyl groups.

The organopolysiloxane containing at least 2 or 3 silicon-bonded hydrogen atoms per molecule (B)(ii)(a) is typically added in an amount such that the molar ratio of the total number of the silicon-bonded hydrogen atoms in component (B)(ii)(a) to the total number of alkenyl and/or alkynyl groups in polymer (A) is from 0.5:1 to 20:1. When this ratio is less than 0.5:1, a well-cured composition will not be obtained. When the ratio exceeds 20:1, there is a tendency for the hardness of the cured composition to increase when heated.

Examples of the organopolysiloxane containing at least 2 or 3 silicon-bonded hydrogen atoms per molecule (B)(ii)(a) include but are not limited to:

(a') trimethylsiloxy-terminated methylhydrogenpolysiloxane,
(b') trimethylsiloxy-terminated polydimethylsiloxane-methylhydrogensiloxane,
(c') dimethylhydrogensiloxy-terminated dimethylsiloxane-methylhydrogensiloxane copolymers,
(d') dimethylsiloxane-methylhydrogensiloxane cyclic copolymers,
(e') copolymers and/or silicon resins consisting of $(CH_3)_2HSiO_{1/2}$ units, $(CH_3)_3SiO_{1/2}$ units and $SiO_{4/2}$ units,
(f') copolymers and/or silicone resins consisting of $(CH_3)_2HSiO_{1/2}$ units and $SiO_{4/2}$ units,
(g') copolymers and/or silicone resins consisting of $(CH_3)_2HSiO_{1/2}$ units, $SiO_{4/2}$ units and $(C_6H_5)_3SiO_{1/2}$ units, and alternatives in which methyl is replaced by phenyl groups or other alkyl groups.

Alternatively, component (B)(ii)(a) the cross-linker, may be a filler, e.g., silica treated with one of the above.

Component (B)(ii)(a) can be exemplified by the following compounds: a methylhydrogenpolysiloxane capped at both molecular terminals with trimethylsiloxy groups; a copolymer of a methylhydrogensiloxane and a dimethylsiloxane capped at both molecular terminals with trimethylsiloxy groups; dimethylsiloxane capped at both molecular terminals with dimethylhydrogensiloxy groups; a copolymer of a methylhydrogensiloxane and a dimethylsiloxane capped at both molecular terminals with dimethylhydrogensiloxy groups; a copolymer of a methylhydrogensiloxane and a methylphenylsiloxane capped at both molecular terminals with dimethylphenylsilyoxy groups; a cyclic methylhydrogenpolysiloxane; a copolymer consisting of $(CH_3)_2HSiO_{1/2}$ siloxane units and $SiO_{4/2}$ units; a copolymer consisting of $(CH_3)_2HSiO_{1/2}$ siloxane units, $(CH_3)_3SiO_{1/2}$ siloxane units, and $SiO_{4/2}$ units, the aforementioned organopolysiloxanes in which a part or all methyl groups are substituted with ethyl, propyl, or similar alkyl groups; phenyl, tolyl, or similar aryl groups; 3,3,3-trifluoropropyl, or similar halogenated alkyl groups; or a mixture of two or more of the aforementioned organopolysiloxanes.

The organopolysiloxane cross-linker (B)(ii)(a) is generally present in the curable silicone elastomer composition in an amount such that the ratio of the mole number of silicon-bonded hydrogen atoms of component (B)(ii)(a) to the mole number of alkenyl groups of component (A) ranges from (0.7:1.0) to (5.0:1.0), preferably from (0.9:1.0) to (2.5:1.0), and most preferably from (0.9:1.0) to (2.0:1.0).

The silicon-bonded hydrogen (Si—H) content of component (B)(ii)(a) is determined using quantitative infra-red analysis in accordance with ASTM E168. In the present instance the silicon-bonded hydrogen to alkenyl (vinyl) and/or alkynyl ratio is important when relying on a hydrosilylation cure process. Generally, this is determined by calculating the total weight % of alkenyl groups in the composition, e.g., vinyl [V] and the total weight % of silicon bonded hydrogen [H] in the composition and given the molecular weight of hydrogen is 1 and of vinyl is 27 the molar ratio of silicon bonded hydrogen to vinyl is 27[H]/[V].

Typically dependent on the number of unsaturated groups in component (A) and the number of Si—H groups in component (B)(ii)(a), component (B)(ii)(a) will be present in an amount of from 0.1 to 40% by weight of the total composition, alternatively from 0.5 to 20%, by weight of the total composition alternatively 0.5 to 10% by weight of the total composition, further alternatively from 1% to 5% by weight of the total composition.

Component (B)(ii)(b) is at least one hydrosilylation (addition) reaction catalyst. These are usually selected from catalysts of the platinum metal group (platinum, ruthenium, osmium, rhodium, iridium and palladium), or a compound of one or more of such metals. Platinum and rhodium compounds are preferred due to the high activity level of these catalysts in hydrosilylation reactions. Component (B)(ii)(b) catalyses the reaction between the alkenyl e.g. vinyl groups of component (A) and the Si—H groups of component (B)(ii)(a) resulting in a cross-linked network when the curable silicone elastomer compositions is cured to an elastomer.

The catalyst (B)(ii)(b) can be a platinum group metal, a platinum group metal deposited on a carrier, such as activated carbon, metal oxides, such as aluminum oxide or silicon dioxide, silica gel or powdered charcoal, or a compound or complex of a platinum group metal.

Examples of preferred hydrosilylation catalysts (B)(ii)(b) are platinum based catalysts, for example, platinum black, platinum on various solid supports, chloroplatinic acids, alcohol solutions of chloroplatinic acid, and complexes of chloroplatinic acid with ethylenically unsaturated compounds such as olefins and organosiloxanes containing ethylenically unsaturated silicon-bonded hydrocarbon groups. Soluble platinum compounds that can be used include, for example, the platinum-olefin complexes of the formulae $(PtCl_2 \cdot olefin)_2$ and $H(PtCl_3 \cdot olefin)$, preference being given in this context to the use of alkenes having 2 to 8 carbon atoms, such as ethylene, propylene, isomers of butene and of octene, or cycloalkanes having 5 to 7 carbon atoms, such as cyclopentene, cyclohexene, and cycloheptene. Other soluble platinum catalysts are, for the sake of example a platinum-cyclopropane complex of the formula $(PtCl_2\text{-}C_3H_6)_2$, the reaction products of hexachloroplatinic acid with alcohols, ethers, and aldehydes or mixtures thereof, or the reaction product of hexachloroplatinic acid with methylvinylcyclotetrasiloxane in the presence of sodium bicarbonate in ethanolic solution. Platinum catalysts with phosphorus, sulfur, and amine ligands can be used as well, e.g., $(Ph_3P)_2PtCl_2$; and complexes of platinum with vinylsiloxanes, such as sym-divinyltetramethyldisiloxane.

Hence, specific examples of suitable platinum-based catalysts include
(i) complexes of chloroplatinic acid with organosiloxanes containing ethylenically unsaturated hydrocarbon groups are described in U.S. Pat. No. 3,419,593;
(ii) chloroplatinic acid, either in hexahydrate form or anhydrous form;
(iii) a platinum-containing catalyst which is obtained by a method comprising reacting chloroplatinic acid with an aliphatically unsaturated organosilicon compound, such as divinyltetramethyldisiloxane;
(iv) alkene-platinum-silyl complexes as described in U.S. Pat. No. 6,605,734 such as $(COD)Pt(SiMeCl_2)_2$ where "COD" is 1,5-cyclooctadiene; and/or
(v) Karstedt's catalyst, a platinum divinyl tetramethyl disiloxane complex typically containing about 1 wt. % of platinum in a solvent, such as toluene may be used. These are described in U.S. Pat. Nos. 3,715,334 and 3,814,730.

The hydrosilylation catalyst (B)(ii)(b) of the hydrosilylation curable silicone elastomer composition used is present in the total composition in a catalytic amount, i.e., an amount or quantity sufficient to catalyse the addition/hydrosilylation reaction and cure the composition to an elastomeric material under the desired conditions. Varying levels of the hydrosilylation catalyst (B)(ii)(b) can be used to tailor reaction rate and cure kinetics. The catalytic amount of the hydrosilylation catalyst (B)(ii)(b) is generally between 0.01 ppm, and 10,000 parts by weight of platinum-group metal, per million parts (ppm), based on the weight of the composition polymer (A) and filler (C); alternatively, between 0.01 and 5000 ppm; alternatively, between 0.01 and 3,000 ppm, and alternatively between 0.01 and 1,000 ppm. In specific embodiments, the catalytic amount of the catalyst may range from 0.01 to 1,000 ppm, alternatively 0.01 to 750 ppm, alternatively 0.01 to 500 ppm and alternatively 0.01 to 100 ppm of metal based on the weight of the composition. The ranges may relate solely to the metal content within the catalyst or to the catalyst altogether (including its ligands) as specified, but typically these ranges relate solely to the metal content within the catalyst. The catalyst may be added as a single species or as a mixture of two or more different species. Typically, dependent on the form/concentration in which the catalyst package is provided the amount of catalyst present will be within the range of from 0.001 to 3.0 wt. % of the composition.

Component (C) is one or more finely divided, reinforcing fillers optionally in combination with one or more and/or non-reinforcing fillers.

The reinforcing fillers of component (C) may be exemplified by finely divided fumed silica and/or a finely divided precipitated silica, colloidal silica and/or suitable silicone resins.

Precipitated silica, fumed silica and/or colloidal silicas are particularly preferred because of their relatively high surface area, which is typically at least 50 $m^2/g$ (BET method in accordance with ISO 9277: 2010). Fillers having surface areas of from 50 to 450 $m^2/g$ (BET method in accordance with ISO 9277: 2010), alternatively of from 50 to 300 $m^2/g$ (BET method in accordance with ISO 9277: 2010), are typically used. All these types of silica are commercially available.

When reinforcing filler (C) is naturally hydrophilic (e.g. untreated silica fillers), it is typically treated with a treating agent to render it hydrophobic. These surface modified reinforcing fillers (C) do not clump and can be homogeneously incorporated into polydiorganosiloxane polymer (A), described below, as the surface treatment makes the fillers easily wetted by polydiorganosiloxane polymer (A).

Typically reinforcing filler (C) may be surface treated with any low molecular weight organosilicon compounds disclosed in the art applicable to prevent creping of organosiloxane compositions during processing. For example, organosilanes, polydiorganosiloxanes, or organosilazanes e.g., hexaalkyl disilazane, short chain siloxane diols to render the filler(s) hydrophobic and therefore easier to handle and obtain a homogeneous mixture with the other ingredients. Specific examples include, but are not restricted to, silanol terminated trifluoropropylmethyl siloxane, silanol terminated vinyl methyl (ViMe) siloxane, silanol terminated MePh siloxane, liquid hydroxyldimethyl-terminated polydiorganosiloxane containing an average from 2 to 20 repeating units of diorganosiloxane in each molecule, hydroxyldimethyl terminated Phenylmethyl Siloxane, hexaorganodisiloxanes, such as hexamethyldisiloxane, divinyltetramethyldisiloxane; hexaorganodisilazanes, such as hexamethyldisilazane (HMDZ), divinyltetramethyldisilazane and tetramethyldi(trifluoropropyl)disilazane; hydroxyldimethyl terminated polydimethylmethylvinyl siloxane, octamethyl cyclotetrasiloxane, and silanes including but not limited to methyltrimethoxysilane, dimethyldimethoxysilane, vinyltrimethoxysilane, methyltriethoxysilane, vinyltriethoxysilane, chlrotrimethyl silane, dichlrodimethyl silane, trichloromethyl silane. A small amount of water can be added together with the silica treating agent(s) as processing aid.

The surface treatment may be undertaken prior to introduction in the composition or in situ (i.e., in the presence of at least a portion of the other ingredients of the composition herein by blending these ingredients together at room temperature or above until the filler is completely treated. Typically, untreated reinforcing filler (C) is treated in situ with a treating agent in the presence of polydiorganosiloxane polymer (A) which results in the preparation of a silicone elastomer base material which can subsequently be mixed with other ingredients.

Reinforcing filler (C) is present in an amount of from 5.0 to 40 wt. % of the solids content of the composition, alternatively of from 7.5 to 35 wt. % of the solids content of the composition, alternatively of from 10.0 to 35 wt. % based on the weight % of the solids content of the composition. Hence, the amount of reinforcing filler (C) e.g., finely divided silica and/or silicone resins may therefore be for example, from 2.0 to 20 wt. % of the total composition, alternatively of from 2.5 to 15 wt. % of the total composition. In some instances, the amount of reinforcing filler may be of from 5.0 to 15 wt. % based on the weight of the total composition.

Non-reinforcing fillers may optionally be included in component (C) herein. These may include, for the sake of example, crushed quartz, calcium carbonate, diatomaceous earths, barium sulphate, iron oxide, titanium dioxide and carbon black, talc, wollastonite, aluminite, calcium sulphate (anhydrite), gypsum, calcium sulphate, magnesium carbonate, clays such as kaolin, aluminium trihydroxide, magnesium hydroxide (brucite), graphite, copper carbonate, e.g. malachite, nickel carbonate, e.g. zarachite, barium carbonate, e.g. witherite and/or strontium carbonate e.g. strontianite.

Other non-reinforcing fillers may include, aluminium oxide, silicates from the group consisting of olivine group; garnet group; aluminosilicates; ring silicates; chain silicates; and sheet silicates. The olivine group comprises silicate minerals, such as but not limited to, forsterite and $Mg_2SiO_4$. The garnet group comprises ground silicate minerals, such as but not limited to, pyrope; $Mg_3Al_2Si_3O_{12}$; grossular; and $Ca_2Al_2Si_3O_{12}$. Aluminosilicates comprise ground silicate minerals, such as but not limited to, sillimanite; $Al_2SiO_5$; mullite; $3Al_2O_3.2SiO_2$; kyanite; and $Al_2SiO_5$. Ring silicates may be utilised as non-reinforcing fillers, these include silicate minerals, such as but not limited to, cordierite and $Al_3(Mg,Fe)_2[Si_4AlO_{18}]$. The chain silicates group comprises ground silicate minerals, such as but not limited to, wollastonite and $Ca[SiO_3]$. Sheet silicates may alternatively or additionally be used as non-reinforcing fillers where appropriate group comprises silicate minerals, such as but not limited to, mica; $K_2Al_{14}[Si_6Al_2O_{20}](OH)_4$; pyrophyllite; $Al_4[Si_8O_{20}](OH)_4$; talc; $Mg_6[Si_8O_{20}](OH)_4$; serpentine for example, asbestos; Kaolinite; $Al_4[Si_4O_{10}](OH)_8$; and vermiculite. In one alternative the fillers will be selected from one or more of fumed silica, precipitated silica, calcium carbonate, talc, mica, quartz and, aluminium oxide.

As previously indicated component (D) as hereinbefore described is one or more organopolysiloxane based additives each of which comprises at least one, alternatively at least two Si—H groups per molecule and at least one, alternatively at least two functional groups per molecule, selected from anhydride groups and epoxy groups.

For example, the or each organopolysiloxane based additive may be a phenylmethylpolysiloxane based additive which comprises at least one, alternatively at least two Si—H groups per molecule and at least one, alternatively at least two functional groups per molecule, selected from anhydride groups and epoxy groups or a polydimethylsiloxane based additive which comprises at least one, alternatively at least two Si—H groups per molecule and at least one, alternatively at least two functional groups per molecule, selected from anhydride groups and epoxy groups.

In one embodiment the or each organopolysiloxane based additive (D) may be of the following formula $$D(Z)_d—(O)—[Y]—(SiR^3{}_2—Z)_dD$$

in which each D group is a cyclic siloxane of the structure $$[(O—Si(-)R^3)(OSiR^3H)_m(OSiR^3X)_a]$$

wherein each $R^3$ group is an alkyl group containing from 1 to 6 carbons and each X is a group containing an anhydride or epoxide functionality in which m is an integer of at least 1, alternatively from 1 to 20, alternatively from 1 to 10, alternatively from 1 to 6 and a is an integer of at least 1, alternatively from 1 to 20, alternatively from 1 to 10, alternatively from 1 to 6; preferably m+a is from 2 to 20, alternatively from 2 to 10, alternatively from 2 to 6; and [Y] is a linear siloxane group of the structure $[SiPhR^3O]_n$, $(SiR^3{}_2O)_n$ or $[SiPh_2O]_n$; alternatively of the structure $[SiPhR^3O]_n$ or $(SiR^3{}_2O)_n$;

Wherein Ph is a phenyl group, Z is an alkylene group having from 2 to 10, alternatively 2 to 6 carbons and n is an integer of from 2 to 20 with d=e=0 or 1 and d+e=1 and [Y] is $(SiR^3{}_2O)$, when d=1.

In the latter the Si in the $[(O—Si(-)R^3)$ group in the cyclic siloxane D is bonded to the linear siloxane group via an oxygen. Each $R^3$ group may be the same or different and is an alkyl group or substituted alkyl group containing from 1 to 6 carbons, alternatively each $R^3$ group may be the same of different and is an alkyl group or substituted alkyl group selected from a methyl, ethyl, propyl group, trifluoropropyl or nonafluorohexyl, alternatively a methyl or ethyl group. Each X group is added to the ring of a cyclic siloxane D by replacing an Si—H group in the ring with an Si—X group. Each cyclic siloxane D may have the same or a different number of members in the ring, for example from 6 to 20 members in the ring, alternatively from 6 to 16 members in the ring, alternatively from 6 to 14 members in the ring, alternatively from 8 to 12 members in the ring, e.g. the following

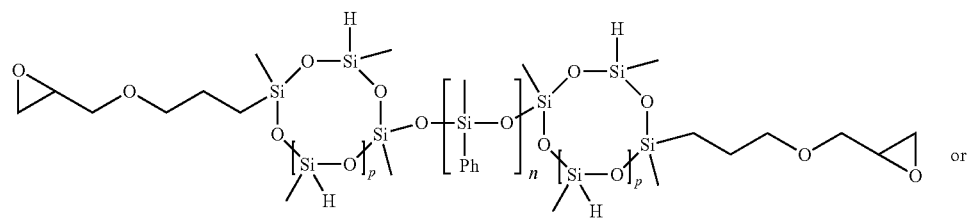

[2]

or

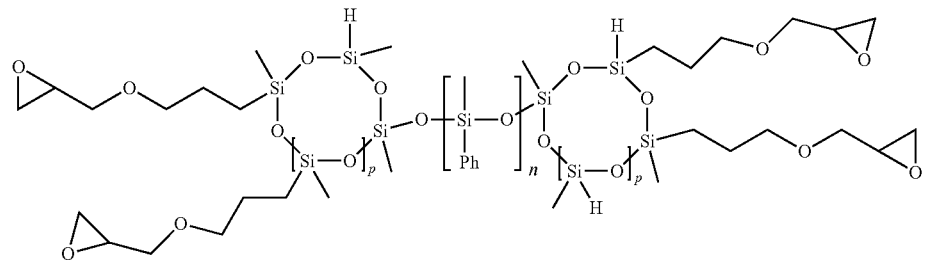

[3]

where each p in either of formulas [2] or [3] above may independently be 1, 2 or 3 or more and indeed component (D) may comprise a mixture of one and/or other of the above in which each p per molecule is 1, 2 or 3 or more. When a mixture is present it is preferred that most molecules preferably are where p is 1. When component/additive (D) is a mixture, the mixture may additionally comprise, for the sake of example, analogous structures to the above but where cyclic siloxane D is a ten membered ring e.g. where p is 2 or a twelve membered ring where p is 3 or the like. In one embodiment the mixture may comprise approximately 50 to 80% of molecules where p is 1, 20 to 49% of molecules where p is 2, and the remainder (if any) being molecules where p is 3 or more, alternatively where p is 3.

An example, when [Y] is a phenylmethylpolysiloxane and where X is an epoxide functional group linked to a silicon of an $(OSiR^3X)$ unit in the cyclic siloxane via an ether group, which can be achieved by reacting an alkenyl glycidyl ether, such as allyl glycidyl ether with an Si—H group intermediate to the cyclic siloxane described above. Hence, for the sake of example, where m=2 and a=1, additive (D) may have the following structure, where cyclic siloxane D is an eight membered ring e.g. where p is 1 although it is to be understood that the X group may replace any of the Si—H groups on the ring of each cyclic siloxane D, and hence is not necessarily in the position depicted:

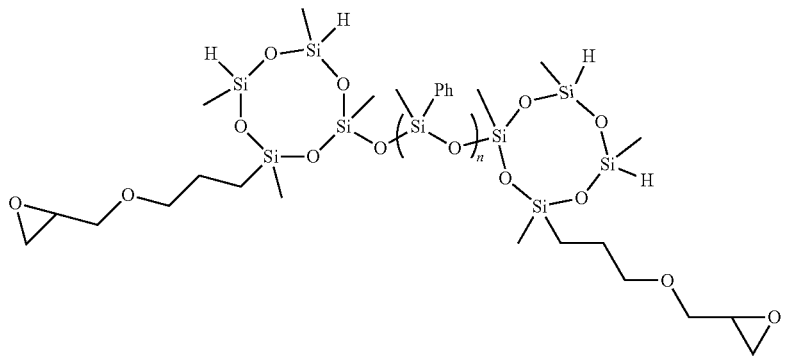

When component/additive (D) is a mixture, comprising the above, the mixture may additionally comprise, for the sake of example, analogous structures to the above such as where cyclic siloxane D is a ten membered ring e.g. where p is 2 (in formula [2]) and/or a twelve membered ring where p is 3 (in formula [2]) or the like.

Likewise, where m=1 and a=2, additive (D) may have the following structure, although it is to be understood that the X group may replace any of the Si—H groups on the ring of each cyclic siloxane D and hence is not necessarily in the position depicted:

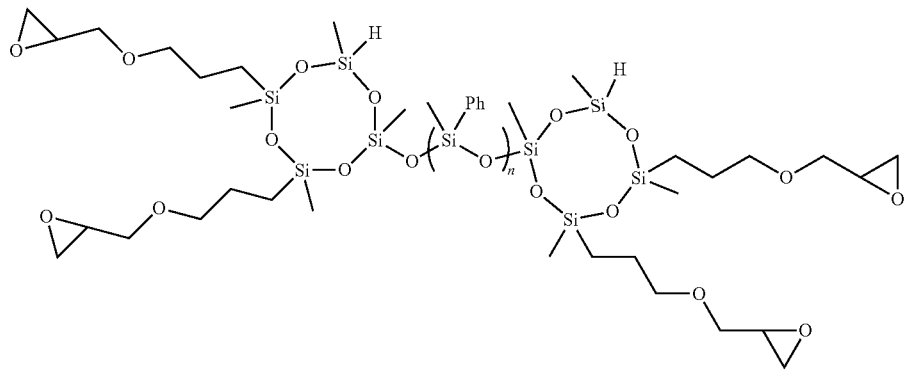

Likewise, when this form of component/additive (D) is a mixture, comprising the above, the mixture may additionally comprise, for the sake of example, analogous structures to the above such as where cyclic siloxane D is a ten membered ring e.g. where p is 2 (in formula [3]) and/or a twelve membered ring where p is 3 (in formula [3]) or the like.

An example, when [Y] is a phenylmethylpolysiloxane and where X is an anhydride functional group linked to a silicon of an $(OSiR^3X)$ unit in the cyclic siloxane via an ether group, which can be achieved by reacting an alkenyl succinic anhydride, such as allyl succinic anhydride with an Si—H group intermediate to the cyclic siloxane described above. Hence, for the sake of example, where m=2 and a=1, additive (D) may have the following structure where cyclic siloxane D is an eight membered ring e.g. where p is 1, although it is to be understood that the X group may replace any of the Si—H groups on the ring of each cyclic siloxane and hence is not necessarily in the position depicted:

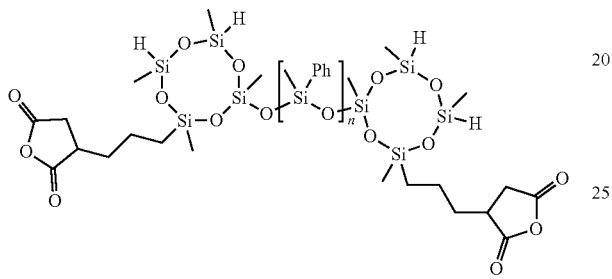

Likewise, when this form of component/additive (D) is a mixture, comprising the above, the mixture may additionally comprise, for the sake of example, analogous structures to the above such as where cyclic siloxane D is a ten membered ring and/or a twelve membered ring where p is 3 or the like.

The phenylmethylpolysiloxane based additives (D) depicted above in which each X is a group containing an anhydride or epoxide functionality may be prepared following the process described in PCT/US19/064350 in the name of the current applicant.

Alternatively when organopolysiloxane based additive (D) has a polydimethylsiloxane based group [Y] and where X is an epoxide functional group linked to a silicon of an $(OSiR^3X)$ unit in the cyclic siloxane. Hence, for the sake of example, where m=2 and a=1, additive (D) may have the following structure where cyclic siloxane D is an eight membered ring e.g. where p is 1, although it is to be understood that the X group may replace any of the Si—H groups on the ring of each cyclic siloxane and hence is not necessarily in the position depicted:
it may have the structure

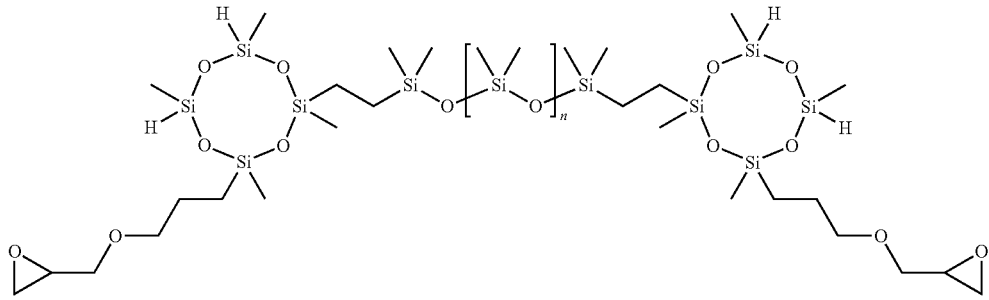

But equally, when this form of component/additive (D) is a mixture, comprising the above, the mixture may additionally comprise, for the sake of example, analogous structures to the above such as where cyclic siloxane D is a ten membered ring e.g. where p is 2 and/or a twelve membered ring where p is 3 or the like.

The amount of component (D) present in the composition herein is typically from 0.01 to 25 weight percent based on the total weight of the composition, or from 0.05 to 5 and most typically from 0.25 to 4 weight percent based on the total weight of the composition. In some cases where component (D) bears more than 2 Si—H groups per molecule, component (D) may also serve to fulfill partially the role of the Si—H component of Component (B). In such cases, one skilled in the art would appreciate that larger percentages of component (D) may be utilized.

Optional additives may be present in the composition depending on the intended use of the curable silicone elastomer composition. Examples include one or more cure inhibitors, vinylated silicone gum, a dimethylvinyl polydiorganosiloxane having a viscosity of from 10 to 750 mPa·s at 25° C., mold releasing agents, adhesion catalysts and/or pigments. Other additives might include electrically conductive fillers, thermally conductive fillers, pot life extenders, flame retardants, lubricants, mold release agents, UV light stabilizers, bactericides, wetting agents, heat stabilizers, chain extenders, compression set additives and plasticizers or the like.

Cure inhibitors are used, when required, to prevent or delay the addition-reaction curing process especially during storage. The optional Addition-reaction inhibitors of platinum based catalysts are well known in the art and include hydrazines, triazoles, phosphines, mercaptans, organic nitrogen compounds, acetylenic alcohols, silylated acetylenic alcohols, maleates, fumarates, ethylenically or aromatically unsaturated amides, ethylenically unsaturated isocyanates, olefinic siloxanes, unsaturated hydrocarbon monoesters and diesters, conjugated ene-ynes, hydroperoxides, nitriles, and diaziridines. Alkenyl-substituted siloxanes as described in U.S. Pat. No. 3,989,667 may be used, of which cyclic methylvinylsiloxanes are preferred.

One class of known hydrosilylation reaction inhibitor includes the acetylenic compounds disclosed in U.S. Pat. No. 3,445,420. Acetylenic alcohols such as 2-methyl-3-butyn-2-ol constitute a preferred class of inhibitors that will suppress the activity of a platinum-containing catalyst at 25° C. Compositions containing these inhibitors typically require heating at temperature of 70° C. or above to cure at a practical rate.

Examples of acetylenic alcohols and their derivatives include 1-ethynyl-1-cyclohexanol (ETCH), 2-methyl-3-butyn-2-ol, 3-butyn-1-ol, 3-butyn-2-ol, propargylalcohol, 1-phenyl-2-propyn-1-ol, 3,5-dimethyl-1-hexyn-3-ol, 1-ethynylcyclopentanol, 3-methyl-1-penten-4-yn-3-ol, and mixtures thereof. Derivatives of acetylenic alcohol may include those compounds having at least one silicon atom.

When present, inhibitor concentrations as low as 1 mole of inhibitor per mole of the metal of catalyst will in some instances impart satisfactory storage stability and cure rate. In other instances, inhibitor concentrations of up to 500 moles of inhibitor per mole of the metal of catalyst are required. The optimum concentration for a given inhibitor in a given composition is readily determined by routine experimentation. Dependent on the concentration and form in which the inhibitor selected is provided/available commercially, when present in the composition, the inhibitor is typically present in an amount of from 0.0125 to 10% by weight of the composition.

If deemed necessary the composition may additionally contain a vinylated silicone gum. Such gums typically have an analogous structure to component A, with dimethylvinyl terminal groups a polydimethylsiloxane polymer chain but potentially some vinyl methyl group combination along the length of the polymer chain may be present. In the case of these polymers the main difference is the chain length and consequent viscosity as opposed to component (A) typically gums of this type have a viscosity of at least 1,000,000 mPa·s at 25° C., often significantly more. However, because of the difficulty in measuring viscosity above these values, gums tend to be described by way of their Williams plasticity values in accordance with ASTM D-926-08 as opposed to by viscosity. Gums of the type described herein typically have a William's plasticity of from 30 mm/100, alternatively at least 50 mm/100 alternatively at least 100 mm/100, alternatively in a range of from 100 mm/100 to 350 mm/100 in accordance with ASTM D-926-08.

A dimethylvinyl polydiorganosiloxane having a viscosity of from 10 to 750 mPa·s at 25° C. Such dimethylvinyl polydiorganosiloxane typically have an analogous structure to component (A), with dimethylvinyl terminal groups a polydimethylsiloxane polymer chain but potentially some vinyl methyl group combination along the length of the polymer chain may be present. In the case of these polymers the main difference is the chain length and consequent viscosity as opposed to component (A) polymers of this type have a zero shear viscosity of from 10 to 750 mPa·s at 25° C. The zero shear viscosity is obtained by extrapolating to zero the value taken at low shear rates where the viscosity-shear rate curve is rate-independent, which is a test-method independent value. The zero shear viscosity of a substance at 25° C. is typically obtained using a rheometer or a viscometer such as a Brookfield® rotational viscometer using Spindle (LV-4) and adapting the speed according to the polymer viscosity.

Examples of electrical conductive fillers include metal particles, metal oxide particles, metal-coated metallic particles (such as silver plated nickel), metal coated non-metallic core particles (such as silver coated talc, or mica or quartz) and a combination thereof. Metal particles may be in the form of powder, flakes or filaments, and mixtures or derivatives thereof.

Examples of thermally conductive fillers include boron nitride, alumina, metal oxides (such as zinc oxide, magnesium oxide, and aluminium oxide), graphite, diamond, and mixtures or derivatives thereof.

Examples of chain extender include straight chain organopolysiloxanes containing 2 silicon-bonded hydrogen groups on the terminal position. Such chain extender is different from component (B)(ii)(a) the cross-linker in the form of an organopolysiloxane containing at least 2 or 3 silicon-bonded hydrogen atoms per molecule. Examples of chain extenders include but are not limited to disiloxane or a low molecular weight polyorganosiloxane containing two silicon-bonded hydrogen atoms at the terminal positions. The chain extender typically reacts with the alkenyl radicals of polymers (A) thereby linking two or more molecules of polymers (A) together and increasing its effective molecular weight and the distance between potential cross-linking sites.

A disiloxane is typically represented by the general formula $(HR^a{}_2Si)_2O$. When the chain extender is a polyorganosiloxane, it has terminal units of the general formula $HR^a{}_2SiO_{1\!/\!2}$ and non-terminal units of the formula $R^b{}_2SiO$. In these formulae, $R^a$ and $R^b$ individually represent unsubstituted or substituted monovalent hydrocarbon radicals that are free of ethylenic unsaturation and fluoro content, which include, but are not limited to alkyl groups containing from 1 to 10 carbon atoms, substituted alkyl groups containing from 1 to 10 carbon atoms such as chloromethyl, cycloalkyl groups containing from 3 to 10 carbon atoms, aryl containing 6 to 10 carbon atoms, alkaryl groups containing 7 to 10 carbon atoms, such as tolyl and xylyl, and aralkyl groups containing 7 to 10 carbon atoms, such as benzyl.

Further examples of chain extenders include tetramethyldihydrogendisiloxane or dimethylhydrogen-terminated polydimethylsiloxane.

A chain extender may be added in an amount from 1 to 10 parts by weight, based on the weight of polymers (A), typically 1 to 10 parts per 100 parts of the combination of polymers (A).

Optionally an adhesion promoter may be present in the composition. Any suitable adhesion promoter(s) may be utilised. These may comprise or consist of one or more alkoxysilanes containing methacrylic groups or acrylic groups and/or one or more alkoxysilanes containing epoxy groups and optionally one or more condensation catalyst which, when present, is used to activate and/or accelerate the reaction of the adhesion promoter.

Examples of alkoxysilanes containing methacrylic groups or acrylic groups such as methacryloxymethyl-trimethoxysilane, 3-methacryloxypropyl-trimethoxysilane, 3-methacryloxypropyl-methyldimethoxysilane, 3-methacryloxypropyl-dimethylmethoxysilane, 3-methacryloxypropyl-triethoxysilane, 3-methacryloxypropyl-methyldiethoxysilane, 3-methacryloxyisobutyl-trimethoxysilane, or a similar methacryloxy-substituted alkoxysilane; 3-acryloxypropyl-trimethoxysilane, 3-acryloxypropyl-methyldimethoxysilane, 3-acryloxypropyl-dimethyl-methoxysilane, 3-acryloxypropyl-triethoxysilane, or a similar acryloxy-substituted alkyl-containing alkoxysilane.

Examples of epoxy-containing alkoxysilanes which may be used as adhesion promoter may include 3-glycidoxypropyl trimethoxysilane, 3-glycidoxypropyl triethoxysilane, 3-glycidoxypropyl methyldimethoxysilane, 4-glycidoxybutyl trimethoxysilane, 5,6-epoxyhexyl triethoxysilane, 2-(3,4-epoxycyclohexyl) ethyltrimethoxysilane, or 2-(3,4-epoxycyclohexyl) ethyltriethoxysilane.

Adhesion catalysts, i.e. condensation catalysts used to activate and/or accelerate the reaction of the adhesion promoter described above may also be utilised. Such condensation catalysts may be selected from organometallic catalysts comprising titanates, e.g. Tetrapropoxy titanate; zirconates, organo aluminium chelates, titanium chelates and/or zirconium chelates.

For example, titanate and Zirconate based catalysts may comprise a compound according to the general formula $Ti[OR^5]4$ or $Zr[OR^5]4$ where each $R^5$ may be the same or different and represents a monovalent, primary, secondary or tertiary aliphatic hydrocarbon group which may be linear or branched containing from 1 to 20 carbon atoms, alternatively 1 to 10 carbon atoms. Optionally the titanate or zirconate may contain partially unsaturated groups. Preferred examples of $R^5$ include but are not restricted to methyl, ethyl, propyl, isopropyl, butyl, tertiary butyl and a branched secondary alkyl group such as 2,4-dimethyl-3-pentyl. Preferably, when each $R^5$ is the same, $R^5$ is an isopropyl, branched secondary alkyl group or a tertiary alkyl group, in particular, tertiary butyl. Specific examples include but are not restricted to zirconium tetrapropylate and zirconimn tetrabutyrate, tetra-isopropyl zirconate, zirconium (IV) tetraacetyl acetonate, (sometimes referred to as zirconium AcAc), zirconium (IV) hexafluoracetyl acetonate, zirconium (IV) trifluoroacetyl acetonate, tetrakis (ethyltrifluoroacetyl acetonate) zirconium, tetrakis (2,2,6,6-tetramethyl-heptanethionate) zirconium, zirconium (IV) dibutoxy bis (ethylacetonate), zirconium tributoxyaceylacetate, zircoiurn butoxyacetylacetonate bisethylacetoacetate, zirconium butoxyacetylacetonate bisethylacetoacetate, diisopropoxy bis (2,2,6,6-tetramethyl-heptanethionate) zirconium, or similar zirconium complexes having β-diketones (including alkyl-substituted and fluoro-substituted forms thereof) which are used as ligands. Titanate equivalents of the above zirconates are also included.

Suitable aluminium-based condensation catalysts may include one or more of $Al(OC_3H_7)_3$, $Al(OC_3H_7)_2(CH_3COCH_2COC_{12}H_{25})$, $Al(OC_3H_7)_2(OCOCH_3)$, aluminium acetylacetonate and $Al(OC_3H_7)_2(OCOC_{12}H_{25})$.

If deemed necessary and/or beneficial, the adhesion promoter may also include other ingredients such as other silane coupling agents, organic compounds containing two or more acrylate groups and/or reactive siloxanes.

Examples of adhesion promoters include silane coupling agents, such as methyltrimethoxysilane, vinyltrimethoxysilane, allyltrimethoxysilane, 1,6-bis(trimethylsilyl)hexane, 3-methacryloxypropyltrimethoxysilane and/or glycidoxypropyltrimethoxysilane.

Examples of organic compounds containing two or more acrylate groups include, e.g. diacrylates such as $C_{4\text{-}20}$ alkanediol diacrylate such as hexanediol diacrylate heptanediol diacrylate octanediol diacrylate nonanediol diacrylate and or undecanediol; and/or pentaerythritol tetraacrylate.

Examples of the reactive siloxanes include siloxanes such as hydroxy-terminated dimethyl-methylvinyl siloxane trimethylsiloxy-terminated methylhydrogen siloxane in each case optionally containing one or more perfluoroalkyl chains, such as trifluoropropyl or perfluorobutylethyl side chains. Typically, such siloxanes have a viscosity of from 0.001 to 0.1 Pa·s at 25° C., alternatively of from 0.001 to 0.05 Pa·s at 25° C.

When present, the adhesion promoter is typically present in the composition in an amount of from about 0.1 to 6 wt. % of the composition; alternatively, 0.1 to 4 wt. % of the composition.

Examples of flame retardants include aluminium trihydrate, magnesium hydroxide, magnesium silicates, chlorinated paraffins, chlorinated paraffins, hexabromocyclododecane, triphenyl phosphate, dimethyl methylphosphonate, tris(2,3-dibromopropyl) phosphate (brominated tris), and mixtures or derivatives thereof.

Examples of pigments include iron oxides, carbon black, and mixtures or derivatives thereof.

Examples of lubricants include tetrafluoroethylene, resin powder, graphite, fluorinated graphite, talc, boron nitride, fluorine oil, silicone oil, molybdenum disulfide, and mixtures or derivatives thereof.

Further additives include silicone fluids, such as trimethylsilyl or OH terminated siloxanes. Such trimethylsiloxy or OH terminated polydimethylsiloxanes typically have a viscosity of less than (<) 150 mPa·s at 25° C. When present such silicone fluid may be present in the curable silicone elastomer composition in an amount ranging of from 0.1 to 5% weight, based on the total weight of the composition.

The curable silicone elastomer compositions may comprise:
a curable silicone elastomer composition that can achieve significant adhesion on a thermoplastic substrate, on an organic resin substrate or on a thermoplastic and organic resin substrate surface which comprises:

Component A 10 to 85% by weight based on the total weight of the composition, alternatively 20 to 80% by weight based on the total weight of the composition, alternatively 20 to 75% by weight based on the total weight of the composition, alternatively from 30 to 65% by weight based on the total weight of the composition.

When component (B) is (B)(i) the organo peroxide may be present in an amount of from 0.2 to 3% wt., alternatively 0.2 to 2% wt. in each case based on the weight of the composition.

Alternatively when component (B) is (B)(ii), component (B)(ii)(a) the organopolysiloxane containing at least 2 or 3 silicon-bonded hydrogen atoms per molecule, in an amount of 0.1-40% weight of the total composition, alternatively from 0.5 to 20%, by weight of the total composition alternatively 0.5 to 10% by weight of the total composition, further alternatively from 1% to 5% by weight of the total composition;

Component (B)(ii)(b), at least one hydrosilylation catalyst, in an amount of 0.01-10% by weight of the total composition, alternatively 0.01% to 5% by weight of the total composition, further alternatively from 0.05% to 2% by weight of the total composition;

Component (C), at least one reinforcing and optionally one or more non-reinforcing fillers in an amount of from 1 to 80% by weight, based on the total weight of the composition, alternatively from 1 to 50% by weight, based on the total weight of the composition, alternatively 5 to 50% by weight, based on the total weight of the composition, further alternatively from 8 to 30% by weight, based on the total weight of the composition;

This disclosure is intended to include any of the above combinations providing the total % composition of components (A) to (C) and any optional additives make up 100 wt. % by weight of the composition. The composition above excluding component (D), is 100% by weight. Component (D) is added in an amount calculated on the rest of the composition being 100%.

When cured via hydrosilylation, it is important for the catalyst (B)(ii)(b) to be stored separately from cross-linker (B)(ii)(a) to prevent premature cure during storage. Typically, the catalyst (B)(ii)(b) is included in the part A composition and the cross-linker (B)(ii)(a) and any optional inhibitor are stored in part B composition. Similarly, given component (D) contains multiple Si—H groups when hydrosilylation curable component D should be stored separately from the catalyst (B)(ii)(b). Hence in the case of a hydrosilylation curable composition, typically, the cross-linker (B)(ii)(a), component D and any inhibitor used are all included in the part B composition.

The optional additives (excluding the inhibitor) may be in either part (A) or part (B) or in both parts. They may also be added into the final mixture after parts (A) or part (B) have been combined.

The homogeneous mixing of the components of the present curable silicone elastomer composition may be undertaken by using a suitable mixing means such as a kneader mixer, a Z-blade mixer, a two roll mill (open mill), a three roll mill, a Haake® Rheomix OS Lab mixer, a screw extruder or a twin-screw extruder or the like. Speed mixers as sold by e.g. Hauschild and as DC 150.1 FV, DAC 400 FVZ or DAC 600 FVZ, may alternatively be used.

In use the composition may be cured at any suitable temperature, e.g. a temperature of from 80° C. to 250° C., alternatively from 120° C. to 200° C. It was also determined that typically the sealant formulation had to be applied at a thickness of at least 0.9 mm in order to obtain a Peak Load/Width of at least 3.5 kN/m. It was also found that the cure time of the composition herein was preferably at least 3 minutes duration, alternatively at least 4 minutes duration to ensure good adhesion.

As hereinbefore described in one embodiment, there also provided a process for making an inflatable article comprising:
 (i) applying a first bead of a curable silicone elastomer composition as described herein around the periphery of a first fabric sheet
 (ii) contacting the first bead of the curable silicone elastomer composition with a surface of a second fabric sheet, and
 (iii) forming a non-sewn seam comprising a cured silicone elastomeric product of the curable silicone elastomer composition thereby adhering the first fabric sheet to the fabric sheet through a non-sewn seam; wherein the resulting non-sewn seam-bond has a Peak Load/Width of at least 3.5 kN/m.

As hereinbefore described in one embodiment, there also provided a process for making an inflatable article comprising:
 (i) applying a first bead of a curable silicone elastomer composition as described herein around the periphery of a first fabric sheet;
 (ii) applying a second bead of a curable silicone elastomer composition as hereinbefore described around the periphery of a second fabric sheet;
 (iii) contacting a first exposed surface of the first bead and a second exposed surface of the second bead to form one bead: and
 (iv) forming a non-sewn seam comprising a cured silicone elastomeric product of the curable silicone elastomer composition thereby adhering the first fabric sheet to the second fabric sheet through a non-sewn seam; wherein the resulting non-sewn seam-bond has a Peak Load/Width of at least 3.5 kN/m.

The peak load/width values as described herein are determined by use of the method described in the Examples herein.

The bead of silicone composition as hereinbefore described may be applied to the airbag surface by a pneumatic gun and then the 2-layer airbag is then heated using a suitable means such as, for the sake of example under a platen press to enact a quick-cure process of intertwining the silicone adhesive with the silicone coating disposed onto two fabric layers of the airbag.

In either process the surface of either or both fabric sheets may have been pre-treated prior to application of the composition as hereinbefore described by, for example, plasma, corona and/or UV-C.

The term "plasma" includes many systems having density and temperature varying by many orders of magnitude. Some plasmas are hot and all their microscopic species (ions, electrons, etc.) are in approximate thermal equilibrium, the energy input into the system being widely distributed through atomic/molecular level collisions. Other plasmas, however, particularly those at low pressure (e.g., on the order of 100 Pa) where collisions are relatively infrequent, have their constituent species at widely different temperatures and are called "nonthermal equilibrium" plasmas. In these non-thermal equilibrium plasmas, the free electrons have temperatures of many thousands of degrees Kelvin while the neutral and ionic species remain cooler. Because the free electrons have almost negligible mass, the total system heat content is low and the plasma operates close to room temperature, thus allowing the processing of temperature sensitive materials, such as plastics or polymers, without imposing a damaging thermal burden onto the substrate. However, the hot electrons create, through high energy collisions, a rich source of radicals and excited species with a high chemical potential energy capable of profound chemical and physical reactivity. It is this combination of low temperature operation plus high reactivity which makes non-thermal plasmas a useful tool for surface treating.

In the present case substrates may be 'plasma treated' by exposing the surface to a gaseous state activated by a form of energy externally applied and includes, but is not limited to, plasma jet, dielectric barrier discharge, low pressure glow discharge, atmospheric glow discharge treatment, and liquid precursor plasma.

'Corona treating' means exposing the surface to a locally intense electric field, i.e., non-uniform electric fields generated using point, edge and/or wire sources are conventionally described as corona discharge systems. Corona discharge systems typically operate in ambient air resulting in an oxidative deposition environment. The design of corona discharge systems is such as to generate locally intense discharges which result in variations in energy density across the process chamber.

Whilst the inflatable articles herein are primarily designed to not have the fabric sheets pre-treated, prior to being adhered together using the composition herein, the fabric sheets may be made impermeable to gas leaks by the application of an elastomeric coating so that the combination of the coating of the two sheets and the adhesion therebetween using the composition as hereinbefore described is together able to function as a seal such that that the gas from the inflator does not leak out from between the layers. The sheets may be coated with a variety of elastomeric coatings, for example a silicone composition, an acrylic, a polyurethane, or other suitable material. The coating can fill the openings (or voids) formed between the woven yarns (or fibers) of the fabric sheets, to prevent or substantially reduce high pressure inflation gas from escaping through the porosity of the woven panels during deployment of the airbag. If applied, the coating May be applied to both sides of an airbag panel or selectively applied on only one side. Preferably, when present, the coating is in the form of a suitable liquid silicone rubber, because of its high heat resistance, low gas-permeability, and high non flammability. Coated air bags generally have improved air tightness.

If applied, the coatings may be applied by any desired process e.g. spraying, gravure coating, bar coating, coating by knife-over-roller, coating by knife-over-air, padding, dipping and screen-printing. Such coatings are generally applied at a coat-weight of at least 10 g/m$^2$ and preferably at least 15 g/m$^2$ and may be applied at up to 100 or 150 g/m$^2$.

The fabric is preferably a woven fabric, particularly a plain weave fabric, but can for example be a knitted or nonwoven fabric. The fabric may be made from synthetic fibres or blends of natural and synthetic fibres, for example polyamide fibres such as nylon-6,6, polyester, polyimide, polyethylene, polypropylene, polyester-cotton, or glass fibres. For use as air bag fabric, the fabric should be sufficiently flexible to be able to be folded into relatively small volumes, but also sufficiently strong to withstand deployment at high speed, e.g. under the influence of an explosive charge.

EXAMPLES

In the following examples all viscosities were measured using a Brookfield® rotational viscometer using Spindle (LV-4) and adapting the speed according to the polymer viscosity. All viscosity measurements were taken at 25° C. unless otherwise indicated.

TABLE 1a composition used for examples with varying Additives as indicated below

| Ingredient | Control Part A (wt. %) | Control Part B (wt. %) | Part A Ex. 1-5 (wt. %) |
|---|---|---|---|
| Masterbatch 1 | 50.30 | 50.87 | 50.30 |
| dimethylvinyl-terminated Dimethyl siloxane gum having a Williams plasticity of 156 mm/100 (ASTM D-926-08)(Gum 1) | 1.75 | 1.70 | 1.75 |
| Calcium carbonate, fatty acid treated | 17.55 | 17.06 | 17.55 |
| Quartz (average particle size 5 μm) | 5.84 | 5.68 | 5.84 |
| Dimethyl hydroxy terminated Dimethyl siloxane viscosity of 42 mPa · s | 1.75 | 1.70 | 1.75 |
| Dimethylvinyl terminated Dimethyl siloxane, viscosity of about 57,000 mPa · s (Polymer 1) | 12.78 | 9.50 | 12.78 |
| Karstedt's (Pt) catalyst in vinyl polymer Dimethyl siloxane, dimethylvinylsiloxy-terminated (catalyst 1) | 1.69 | — | 1.69 |
| Ethynyl cyclohexanol (ETCH) in Dimethyl, methylvinyl siloxane, dimethylvinylsiloxy-terminated (inhibitor 1) | — | 1.26 | — |
| Dimethyl, methylvinyl siloxane, dimethylvinylsiloxy-terminated viscosity of about 340 mPa · s | 7.73 | 3.15 | 7.73 |
| Dimethyl, methylhydrogen siloxane, trimethylsiloxy-terminated viscosity of about 12-13 mPa · s | — | 0.66 | — |
| Dimethyl siloxane, hydrogen-terminated viscosity of about 10 mPa · s | — | 5.04 | — |
| 50 wt % zirconium (IV) acetylacetonate in 50 wt % vinyl terminated polydimethylsiloxane | | | 0.60 |

Masterbatch 1 comprises 68.7% of polymer 1 and 31.3% treated silica.

TABLE 1b

Compositions of part B for Examples 1 to 5 in wt. % of the part B composition

| Ingredient | Pt. B Ex. 1 | Pt. B Ex. 2 | Pt. B Ex. 3 | Pt. B Ex. 4 | Pt. B Ex. 5 |
|---|---|---|---|---|---|
| Masterbatch 1 | 51.42 | 50.33 | 49.81 | 49.30 | 50.87 |
| Gum. 1 | 1.72 | 1.68 | 1.67 | 1.65 | 1.70 |
| Calcium carbonate, fatty acid treated | 17.25 | 16.88 | 16.71 | 16.54 | 17.06 |
| Quartz (average particle size 5 μm) | 5.74 | 5.62 | 5.56 | 5.51 | 5.68 |
| Dimethyl hydroxy terminated Dimethyl siloxane viscosity of 42 mPa · s | 1.72 | 1.68 | 1.67 | 1.65 | 1.7 |
| Polymer 1 | 9.60 | 9.40 | 9.30 | 9.20 | 9.5 |
| Inhibitor 1 | 1.27 | 1.24 | 1.23 | 1.22 | 1.26 |
| Dimethyl, methylvinyl siloxane, dimethylvinylsiloxy-terminated viscosity of about 340 mPa · s | 3.18 | 3.12 | 3.08 | 3.05 | 3.15 |
| Dimethyl, methylhydrogen siloxane, trimethylsiloxy-terminated viscosity of about 12-13 mPa · s | 0.66 | 0.65 | 0.64 | 0.64 | 0.66 |
| Dimethyl siloxane, hydrogen-terminated viscosity of about 10 mPa · s | 5.10 | 4.99 | 4.94 | 4.89 | 5.04 |
| Additive 1 | 2.34 | 4.40 | 5.39 | 6.37 | 3.38 |

Additive 1 indicated in Table 1b above was a mixture of component (D) structures prepared following the process described in U.S. Pat. No. 7,429,636, comprising a majority of molecules (approximately e.g. 57.5 to 62%) having a structure wherein [Y] is a polydimethylsiloxane chain, d is 1, e is zero, m is 2, a is 1, the number of silicons in the linear chain (n+2 in the following structure) is an average about 7 and each cyclic siloxane is an eight membered ring, and it is to be understood that the X group can replace any of the Si—H groups originally positioned in the ring of each cyclic siloxane so the main ingredient of the mixture maybe but is not necessarily the following structure:—

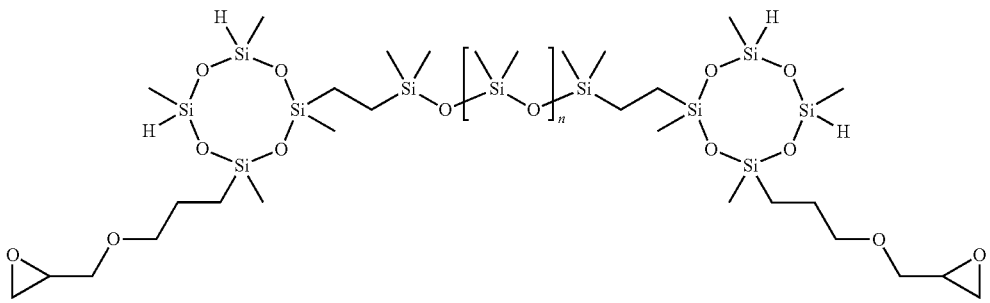

The rest being a mixture of analogous molecules in which cyclic siloxanes D in the structure were 10 membered rings (approximately 35 to 40%) and the remainder (approximately >0-5%) were where the cyclic siloxanes D in the structure were 12 membered rings. The total amount adding up to 100%

Physical Properties of Cured Slabs

The formulation specified in the adhesive composition section was used to prepare slabs for measuring physical properties. The respective Part A and part B for compositions as depicted in Table 1 above was mixed in a 1:1 weight ratio using a speedmixer and slabs of each sample were prepared and then cured at 150° C. for 5 minutes. The physical properties were then determined as depicted in table 2 below. Elongation and Modulus results cured test pieces (ASTM D412-98A) using DIN S2 die and Shore A hardness was determined in accordance with (ASTM D2240-97). Tear Strength was measured in accordance with ASTM D264.

TABLE 2

Physical Properties of Control and Ex. 1 to 4

| | Elongation (%) | Modulus at 100% elongation (MPa) | Tear Strength (kN/m) | Shore A hardness |
|---|---|---|---|---|
| Control | 1650 | 0.23 | 26 | 16 |
| Ex. 1 | 851 | 0.72 | 29 | 34 |
| Ex. 2 | 714 | 0.92 | 26 | 39 |
| Ex. 3 | 723 | 0.85 | 26 | 36 |
| Ex. 4 | 782 | 0.79 | 24 | 37 |

Laminates of fabric sheets were prepared using the composition as herein before described including the additives discussed above with a view to assessing the Peak adhesion strength with tearing by peeling the laminate apart at one hundred eighty degrees. As well as the peak adhesion strength, an estimation of the percent cohesive failure is reported which was determined by examining the freshly exposed surface at the completion of the test and estimating the percent cohesive failure. The methodology used was based on ASTM D 413-98 with the following differences machine rate, sample width and sample thickness.

The fabric was cut along the weft direction (~12 in) and then in the warp direction (~16 in) to provide substrate sheets (dimensions 12 in (30.48 cm)×16 in (40.64 cm)). All substrates used were pre-dried at 150° C. for one minute in an oven. The fabric was then removed and placed on a workbench. A chase mold was aligned so that it was positioned straight across the fabric in the weft direction (chase used in this study had a 1.16 mm depth [leads to ~1 mm thick adhesive line and additionally of 0.65 mm depth [leads to ~0.5 mm thick adhesive line], and 1.68 mm depth [leads to ~1.5 mm thick adhesive line]; all internal dimensions are 10 mm x 10 in). The part A and part B compositions were mixed in a 1:1 weight ratio in a speedmixer. A plastic spatula was used to fill the chase with the adhesive. The chase was removed, and a second piece of the respective substrate was placed on top of the sample bead. A Styrofoam roller was then used to gently wet-out the bead. The sample was then cured in the oven at 150° C. for 5 minutes.

As will be seen below some substrate samples were plasma treated before use. Plasma treatment took place after the substrate sheets had been oven treated. For plasma treated samples, a mark was made on the fabric at the center of the plasma treating line; albeit the marks were not made where the adhesive was going to be applied. The bottom piece of fabric was plasma treated using an FG3001 plasma generator from Plasmatreat; speed set to 125 mm/s. The robot coordinates were set with x=82.24 mm, y=13.76 mm, z=117 mm; these coordinates lead to a 7 mm gap from plasma treating head to fabric). After treatment the samples were applied following the process above. The second substrate sheet was plasma treated and applied with the plasma treated surface toward the sealant bead. Samples were then cured as described above.

Samples were allowed to sit at room temperature for about 20 hours until analysis was performed. Four samples were cut from each specimen, which consisted of a 10 in seam. The outer 1 in (2.54 cm) of specimen was discarded and four 2 in (5.08 cm) samples were cut. The length of the fabric was then cut to approximately 6 in (15.24 cm) for each sample. The thickness of each sample was measured. This was done by subtracting the width of two pieces of fabric from the width of the overall sample construction.

Peak adhesion strength with tearing by peeling the laminate apart at one hundred eighty degrees as well as the peak adhesion strength, an estimation of the percent cohesive failure is reported which was determined by examining the freshly exposed surface at the completion of the test and estimating the percent cohesive failure. These were undertaken shortly after cure as discussed above.

In the case of Peak Load/Width samples were tested using an MTS Alliance RF/100 tensile tester. The adhesion specimen was placed in the sample holder crosshead speed was set to 8 in/min (200 mm/min) and the Peak Load/Width was determined. Results provided in the Tables below were an average of four data points.

In the case of the cohesive failure measurement this was achieved by analyzing samples pulled Peak Load/Width for percent cohesive failure. A template that contained a 2×10 grid (4 mm×4 mm squares) was placed at the center of the pulled seam, neglecting approximately 5 mm on each side and 2 mm on the top and bottom of the seam. Each square represents a 5% area. The percent cohesive failure was determined for each sample, and then the average was taken of each of the four replicates. Seam thickness was determined using a digital caliper. First, the entire seam thickness was measured. The thickness of the fabric substrate was subtracted from the entire seam thickness to give the thickness of the adhesive layer for which values are given in the following Tables.

The results for Polyester. 470 DTEX substrates are depicted in Tables 3a.

TABLE 3a

Polyester. 470 DTEX substrate adhesion results

| Treatment | | Cure Temp (° C.) | Cure Time (min) | Seam thickness (mm) | Peak Load/ Width (kN/m) | Mode of failure (% cohesive failure) |
|---|---|---|---|---|---|---|
| Control | Plasma | 150 | 5 | 1.0 | 0.3 | 0 |
| Ex. 1 | Plasma | 150 | 5 | 0.9 | 4.7 | 25 |
| Ex. 2 | Plasma | 150 | 5 | 0.5 | 3.0 | 8 |
| Ex. 2 | Plasma | 150 | 5 | 1.0 | 4.6 | 48 |
| Ex. 3 | Plasma | 150 | 5 | 0.5 | 2.7 | 10 |
| Ex. 3 | Plasma | 150 | 5 | 1.0 | 4.2 | 39 |
| Ex. 4 | Plasma | 150 | 5 | 0.5 | 2.3 | 6 |
| Ex. 4 | Plasma | 150 | 5 | 1.0 | 3.8 | 60 |

It will be appreciated that the control test with no additive or zirconate present achieved no adhesion whilst the other examples in Table 3 achieved adhesion and a Peak Load/Width in accordance with the disclosure herein were obtained for compositions with a seam thickness of at least 0.9 mm. It was also noted results with a seam thickness of at least 0.9 mm gave improved % cohesive failure results.

TABLE 3b

Polyester. 470 DTEX substrate adhesion results for Ex. 5

| Treatment | Cure Temp (° C.) | Cure Time (min) | Seam thickness (mm) | Peak Load/Width (kN/m) | Mode of failure (% cohesive failure) |
|---|---|---|---|---|---|
| Plasma | room temp | 24 h | 0.9 | 0.6 | 0 |
| Plasma | 150 | 5 | 0.5 | 3.9 | 18 |
| Plasma | 150 | 5 | 1.5 | 7.3 | 95 |
| Plasma | 150 | 5 | 1.0 | 5.8 | 72 |
| Plasma | 150 | 1 | 1.0 | 2.9 | 18 |
| Plasma | 150 | 3 | 1.0 | 4.8 | 83 |
| Plasma | 150 | 5 | 0.9 | 6.2 | 84 |
| Plasma | 150 | 10 | 1.0 | 5.7 | 96 |
| Plasma | 150 | 20 | 1.0 | 5.3 | 89 |
| Plasma | 180 | 1 | 0.9 | 2.6 | 9 |
| Plasma | 180 | 2 | 0.9 | 4.2 | 79 |
| Plasma | 180 | 5 | 1.0 | 6.1 | 70 |
| Plasma | 190 | 1 | 1.0 | 2.6 | 10 |
| Plasma | 190 | 2 | 0.9 | 4.7 | 83 |

It was found that adhesion was not achieved when cured at room temperature. Whilst, a seam thickness of 0.5 mm leads to an acceptable Peak Load/Width although there was more adhesive failure than cohesive failure. The latter was improved by having a seam thickness of 1 mm when cured at a temperature of 150° C. It was also found that undertaking cure for at least 3 mins, typically 5 mins gave good results. Adhesion is obtained on plasma treated fabric when sample is cured for 5 min at 150° C. or 180° C.

Similar results were achieved on a nylon 66 substrate as can be seen in Table 4a below as were obtained in Table 3a on a polyester substrate:

TABLE 4a

Nylon 66. substrate adhesion results

| | Treatment | Cure Temp (° C.) | Cure Time (min) | Seam thickness (mm) | Peak Load/ Width (kN/m) | Mode of failure (% cohesive failure) |
|---|---|---|---|---|---|---|
| Control | Plasma | 150 | 5 | 1.0 | 0.3 | 0 |
| Ex. 1 | None | 150 | 5 | 0.5 | 1.0 | 0 |
| Ex. 1 | Plasma | 150 | 5 | 0.5 | 3.5 | TFCF |
| Ex. 1 | Plasma | 150 | 5 | 1.0 | 5.7 | 34 |
| Ex. 2 | Plasma | 150 | 5 | 0.5 | 3.3 | 60 |
| Ex. 2 | Plasma | 150 | 5 | 1.0 | 5.3 | 78 |
| Ex. 3 | Plasma | 150 | 5 | 0.5 | 2.9 | 40 |
| Ex. 3 | Plasma | 150 | 5 | 1.0 | 4.3 | 79 |
| Ex. 4 | Plasma | 150 | 5 | 0.5 | 2.9 | 44 |
| Ex. 4 | Plasma | 150 | 5 | 1.0 | 4.2 | 79 |

TFCF = thin film cohesive failure

As previously indicated the control sample which does not contain any additive (D) does not adhere. It is preferred for the substrate to be activated before use e.g. by plasma activation. It was found that a much better cohesive failure occurred with seam seals of at least 0.9 mm, especially when cured at a temperature of greater than 120° C., especially at around 150° C. additive when cured for at least 3 minutes, preferably 5 minutes or more. As in the case above the tests depicted in Table 3b were repeated for a nylon substrate using the formulation depicted as Ex. 5 in Table 1b. The results are depicted in Table 4b below.

TABLE 4b

Nylon 66. substrate adhesion results for Ex. 5 compositions (+control)

| Treatment | Cure Temp (° C.) | Cure Time (min) | Seam thickness (mm) | Peak Load/Width (kN/m) | Mode of failure (% cohesive failure) |
|---|---|---|---|---|---|
| (Control) Plasma | 150 | 5 | 1.0 | 0.3 | 0 |
| Plasma | room temp | 24 h | 1.0 | 0.5 | 0 |
| Plasma | 150 | 5 | 0.5 | 3.8 | 29 |
| Plasma | 150 | 5 | 1.4 | 6.5 | 97 |
| Plasma | 150 | 5 | 0.9 | 5.0 | 68 |
| Plasma | 150 | 5 | 0.9 | 5.0 | 46 |
| Plasma | 150 | 1 | 1.0 | 2.3 | 3 |
| Plasma | 150 | 3 | 1.0 | 4.1 | 65 |
| Plasma | 150 | 10 | 1.0 | 5.4 | 100 |
| Plasma | 150 | 20 | 1.0 | 5.3 | 97 |
| Plasma | 180 | 1 | 0.9 | 2.4 | 5 |
| Plasma | 180 | 2 | 0.9 | 4.2 | 89 |
| Plasma | 180 | 5 | 1.1 | 5.7 | 91 |
| Plasma | 190 | 1 | 0.9 | 3.1 | 26 |
| Plasma | 190 | 2 | 1.0 | 4.8 | 88 |
| Plasma | 150 | 5 | 1.0 | 4.3 | 79 |
| Plasma | 150 | 5 | 0.5 | 2.9 | 44 |
| Plasma | 150 | 5 | 1.0 | 4.2 | 79 |

TFCF = thin film cohesive failure

Adhesion was not achieved when cured at room temperature. A seam thickness of 0.5 mm rarely provided a sufficient result and it was seen that seals of at least 0.9 mm thickness generally leads to more adhesive failure than cohesive failure and excellent peak Load/Width results. Likewise, it was found that short cure times of less than 3 minutes generally didn't give good enough peak Load/Width results. For example, good results were achieved for adhesion on plasma treated fabric when sample is cured 5 min at temperatures between 150° C. and 190° C.

The above test for Peak Load/Width (kN/m) and cohesive failure were repeated using the formulation of Ex. 5 but by replacing Additive 1 with an anhydride additive (Additive 2) which was a mixture of component (D) structures prepared following the process described in PCT/US19/064350, comprising a majority of molecules (approximately e.g. 51 to 55%) having a structure wherein [Y] is a polymethylphenylsiloxane chain, e is 1, d is zero, m is 2, a is 1 and the value of n is an average between 6 and 7, each X is an anhydride containing group and each cyclic siloxane D is an 8 membered ring and it is to be understood that the X group can replace any of the Si—H groups originally positioned in the ring of each cyclic siloxane D so the main ingredient of the mixture maybe but is not necessarily the following structure.

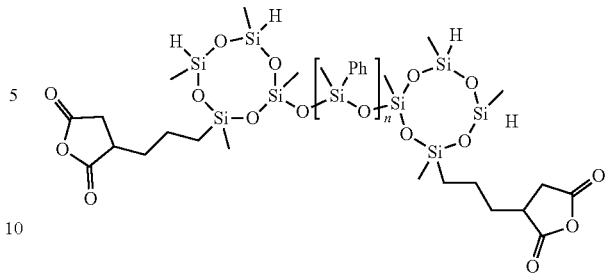

The rest being a mixture of analogous molecules in which cyclic siloxanes in the structure were 10 membered rings (approximately 40 to 45%) and the remainder (approximately >0-5%) were cyclic siloxanes with 12 membered rings. The total amount adding up to 100%

The composition was cured for 5 mins at 150° C. and the seam thickness was 1 mm. The results are provided in Tables 5a (polyester) and 5d (nylon 66) below.

TABLE 5a

Adhesion test on a 470 dtex polyester substrate.

| Additive | Treatment | Peak Load/Width (kN/m) | Cohesive failure (%) |
|---|---|---|---|
| Additive 2 | Plasma | 5.9 | 100 |
| Additive 2 | None | 5.7 | 100 |

It can be seen that adhesion was achieved with the anhydride version of X using a without plasma treatment.

The same test were also undertaken using Additive 2 and Additives 3 and 4 which were two further compounds comprising epoxy groups:—

In Additive 3 which was a mixture of component (D) structures prepared following the process described in PCT/US19/064350, comprising a majority of molecules (approximately e.g. 51 to 55%) having a structure wherein [Y] is a polymethylphenylsiloxane chain, e is 1, d is zero, m is 2, a is 1 and the value of n is an average between 6 and 7, and each cyclic siloxane D is an 8 membered ring, each X is an epoxy containing group and it is to be understood that the X group can replace any of the Si—H groups originally positioned in the ring of each cyclic siloxane D so the main ingredient of the mixture maybe but is not necessarily the following structure

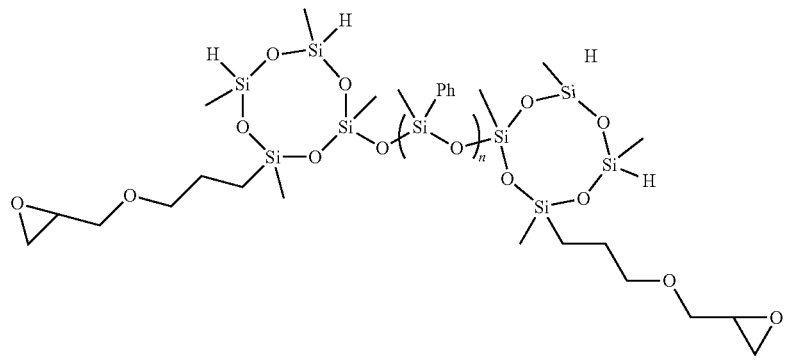

The rest being a mixture of analogous molecules in which cyclic siloxanes in the structure were 10 membered rings (approximately 40 to 45%) and the remainder (approximately >0-5%) were 12 membered rings. The total amount adding up to 100%.

Additive 4 was also a mixture of component (D) structures prepared following the process described in PCT/US19/064350, comprising a majority of molecules (approximately e.g. 51 to 55%) of the equivalent same structure as additive 3 with one difference m is 1, a is 2 and as such it contained 4 epoxy groups as opposed to 2 in Additive 3 so the main ingredient of the mixture maybe but is not necessarily the following structure:

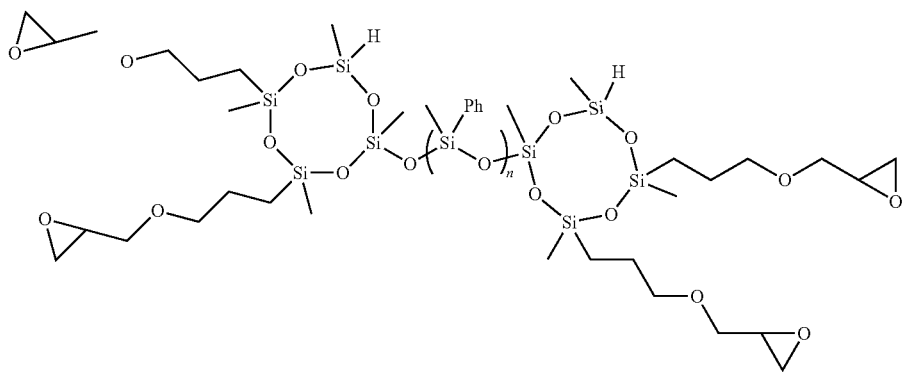

The rest of Additive 4 being a mixture of analogous molecules in which cyclic siloxanes D in the structure were 10 membered rings (approximately 40 to 45%) and the remainder (approximately >0-5%). The total amount adding up to 100%.

The results using Additives 2-4 in the part B composition of Ex. 5 gave the following results.

TABLE 5b

Adhesion test using formulation defined in Table 1 containing Add. 1 on a Nylon 66 substrate.

| Additive | Treatment | Peak Load/Width (kN/m) | Cohesive failure (%) |
|---|---|---|---|
| Additive 2 | Plasma | 5.9 | 98 |
| Additive 2 | None | 5.0 | 98 |
| Additive 3 | Plasma | 4.2 | 99 |
| Additive 4 | Plasma | 5.2 | 99 |

It can be seen that adhesion was achieved with the anhydride both with and without plasma treatment on the substrate. Similar results were obtained on nylon using both epoxides.

The invention claimed is:

1. An inflatable article comprising:
a first fabric sheet and a second fabric sheet superimposed on the first fabric sheet; and
a cured silicone adhesive, forming a non-sewn seam-bond between the first and second fabric sheets such that a bag structure is created;
wherein the non-sewn seam-bond has a peak load/width of at least 3.5 kN/m; and
wherein the cured silicone adhesive is the elastomeric product of a curable silicone elastomer composition comprising:

(A) one or more organopolysiloxanes containing at least 2 alkenyl groups per molecule and having a viscosity in a range of 1,000 to 500,000 mPa·s at 25° C.;
(B) a curing agent comprising
(B)(i) an organic peroxide radical initiator; or
(B)(ii) a hydrosilylation cure catalyst package comprising a hydrosilylation catalyst and an organosilicon compound having at least 2 Si—H groups per molecule, optionally at least 3 Si—H groups per molecule;
(C) at least one reinforcing filler and optionally one or more non-reinforcing fillers; and
(D) one or more organopolysiloxane based additives which comprise at least one Si—H group per molecule, optionally at least two Si—H groups per molecule and which comprises at least one anhydride or epoxy group per molecule, optionally at least two anhydride or epoxy groups per molecule;
wherein component (D) is of the following formula (D1) or (D2):

$$[(XR^3SiO)_a(HR^3SiO)_m(SiR^3O)]—O—Y—[(SiR^3O)(OSiR^3H)_m(OSiR^3X)_a] \quad (D1)$$

$$[(XR^3SiO)_a(HR^3SiO)_m(SiR^3O)]—Z—Y—(SiR^3{}_2—Z)—[(SiR^3O)(OSiR^3H)_m(OSiR^3X)_a] \quad (D2)$$

wherein, in (D1) and (D2), repeating units in [ ] brackets have a cyclic siloxane structure with the silicon atom in (SiR$^3$O) connecting the cyclic siloxane structure to the rest of the molecule, each R$^3$ group is an alkyl group containing from 1 to 6 carbons, each X is a group containing an anhydride or epoxide functionality, m is an integer of at least 1, a is an integer of at least 1; Y is a linear siloxane group of the structure (SiPhR$^3$O)$_n$, (SiR$^3{}_2$O)$_n$, or (SiPh$_2$O)$_n$; Ph is a phenyl group, Z is an alkylene group having from 2 to 10 carbons, optionally 2 to 6 carbons, and n is an integer of from 2 to 20.

2. The inflatable article in accordance with claim 1, wherein component (D) is selected from one or more of the following:
a compound of formula (D2) wherein Y is a polydimethylsiloxane chain, m is 2, a is 1, n has an average value between 4 and 10 and X comprises epoxy functionality;
a compound of formula (D1) wherein Y is a polymethylphenylsiloxane chain, m is 2, a is 1, n has an average value between 4 and 10 and X comprises anhydride functionality;
a compound of formula (D1) wherein Y is a polymethylphenylsiloxane chain, m is 2, a is 1, n has an average value between 4 and 10 and X comprises epoxy functionality;

a compound of formula (D1) wherein Y is a polymethylphenylsiloxane chain, m is 1, a is 2, n has an average value between 4 and 10 and X comprises epoxy functionality.

3. The inflatable article in accordance with claim 1, with the curable silicone elastomer composition additionally comprising a zirconate and/or a titanate.

4. The inflatable article in accordance with claim 1, further defined as an airbag.

5. The inflatable article in accordance with claim 4, wherein the airbag is an uncoated airbag.

6. A seam sealant for an inflatable article, the seam sealant comprising or formed from a curable silicone elastomer composition comprising:
(A) one or more organopolysiloxanes containing at least 2 alkenyl groups per molecule and having a viscosity in a range of 1,000 to 500,000 mPa·s at 25° C.;
(B) a curing agent comprising
(B)(i) an organic peroxide radical initiator; or
(B)(ii) a hydrosilylation cure catalyst package comprising a hydrosilylation catalyst and an organosilicon compound having at least 2 Si—H groups per molecule, optionally at least 3 Si—H groups per molecule;
(C) at least one reinforcing filler and optionally one or more non-reinforcing fillers; and
(D) one or more organopolysiloxane based additives which comprise at least one Si—H group per molecule, optionally at least two Si—H groups per molecule and which comprises at least one anhydride or epoxy group per molecule, optionally at least two anhydride or epoxy groups per molecule;
wherein component (D) is of the following formula (D1) or (D2):

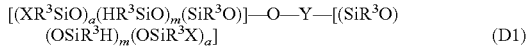

$$[(XR^3SiO)_a(HR^3SiO)_m(SiR^3O)]-O-Y-[(SiR^3O)(OSiR^3H)_m(OSiR^3X)_a] \quad (D1)$$

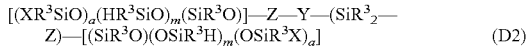

$$[(XR^3SiO)_a(HR^3SiO)_m(SiR^3O)]-Z-Y-(SiR^3_2-Z)-[(SiR^3O)(OSiR^3H)_m(OSiR^3X)_a] \quad (D2)$$

wherein, in (D1) and (D2), repeating units in [] brackets have a cyclic siloxane structure with the silicon atom in (SiR³O) connecting the cyclic siloxane structure to the rest of the molecule, each R³ group is an alkyl group containing from 1 to 6 carbons, each X is a group containing an anhydride or epoxide functionality, m is an integer of at least 1, a is an integer of at least 1; Y is a linear siloxane group of the structure (SiPhR³O)$_n$, (SiR³$_2$O)$_n$, or (SiPh$_2$O)$_n$; Ph is a phenyl group, Z is an alkylene group having from 2 to 10 carbons, optionally 2 to 6 carbons, and n is an integer of from 2 to 20.

7. A process for making an inflatable article, the process comprising:
(i) applying a first bead of the seam sealant in accordance with claim 6 around the periphery of a first fabric sheet;
(ii) contacting the first bead of the seam sealant with a surface of a second fabric sheet; and
(iii) forming a non-sewn seam comprising a cured silicone elastomeric product of the seam sealant thereby adhering the first fabric sheet to the second fabric sheet through a non-sewn seam-bond;
wherein the non-sewn seam-bond has a peak load/width of at least 3.5 kN/m.

8. A process for making an inflatable article, the process comprising:
(i) applying a first bead of the seam sealant in accordance with claim 6 around the periphery of a first fabric sheet;
(ii) applying a second bead of the seam sealant around the periphery of a second fabric sheet;
(iii) contacting a first exposed surface of the first bead and a second exposed surface of the second bead to form one bead; and
(iv) forming a non-sewn seam comprising a cured silicone elastomeric product of the seam sealant thereby adhering the first fabric sheet to the second fabric sheet through a non-sewn seam-bond;
wherein the non-sewn seam-bond has a peak load/width of at least 3.5 kN/m.

9. The process in accordance with claim 7, wherein component (D) is selected from one or more of the following:
a compound of formula (D2) wherein Y is a polydimethylsiloxane chain, m is 2, a is 1, n has an average value between 4 and 10 and X comprises epoxy functionality;
a compound of formula (D1) wherein Y is a polymethylphenylsiloxane chain, m is 2, a is 1, n has an average value between 4 and 10 and X comprises anhydride functionality;
a compound of formula (D1) wherein Y is a polymethylphenylsiloxane chain, m is 2, a is 1, n has an average value between 4 and 10 and X comprises epoxy functionality;
a compound of formula (D1) wherein Y is a polymethylphenylsiloxane chain, m is 1, a is 2, n has an average value between 4 and 10 and X comprises epoxy functionality.

10. The process in accordance with claim 7, wherein the curable silicone elastomer composition of the seam sealant additionally comprises a zirconate and/or a titanate.

11. The process in accordance with claim 7, wherein the inflatable article is an airbag.

12. The process in accordance with claim 7, wherein the first and/or second fabric sheets are activated prior to application of the seam sealant by plasma, corona and/or UV-C.

13. The process in accordance with claim 8, wherein component (D) is selected from one or more of the following:
a compound of formula (D2) wherein Y is a polydimethylsiloxane chain, m is 2, a is 1, n has an average value between 4 and 10 and X comprises epoxy functionality;
a compound of formula (D1) wherein Y is a polymethylphenylsiloxane chain m is 2, a is 1, n has an average value between 4 and 10 and X comprises anhydride functionality;
a compound of formula (D1) wherein Y is a polymethylphenylsiloxane chain, m is 2, a is 1, n has an average value between 4 and 10 and X comprises epoxy functionality;
a compound of formula (D1) wherein Y is a polymethylphenylsiloxane chain, m is 1, a is 2, n has an average value between 4 and 10 and X comprises epoxy functionality.

14. The process in accordance with claim 8, wherein the curable silicone elastomer composition of the seam sealant additionally comprises a zirconate and/or a titanate.

15. The process in accordance with claim 8, wherein the inflatable article is an airbag.

16. The process in accordance with claim 8, wherein the first and/or second fabric sheets are activated prior to application of the seam sealant by plasma, corona and/or UV-C.

* * * * *